US012196407B1

(12) United States Patent
Lambesis et al.

(10) Patent No.: US 12,196,407 B1
(45) Date of Patent: Jan. 14, 2025

(54) SYSTEM AND METHOD FOR MODULAR LIGHTING

(71) Applicant: Pinnacle 20, LLC, Phoenix, AZ (US)

(72) Inventors: Nikos Aristotle Lambesis, Cave Creek, AZ (US); Jeffrey James Kalpakoff, Paradise Valley, AZ (US)

(73) Assignee: Pinnacle 20, LLC, Phoenix, AZ (US)

( * ) Notice: Subject to any disclaimer, the term of this patent is extended or adjusted under 35 U.S.C. 154(b) by 357 days.

(21) Appl. No.: 17/867,626

(22) Filed: Jul. 18, 2022

Related U.S. Application Data

(63) Continuation-in-part of application No. 17/728,851, filed on Apr. 25, 2022, which is a continuation of
(Continued)

(51) Int. Cl.

| | |
|---|---|
| ***F21V 23/06*** | (2006.01) |
| ***F21S 2/00*** | (2016.01) |
| ***F21S 4/10*** | (2016.01) |
| ***F21V 23/00*** | (2015.01) |
| ***F21V 33/00*** | (2006.01) |

(Continued)

(52) U.S. Cl.
CPC ............ *F21V 33/006* (2013.01); *F21S 2/005* (2013.01); *F21S 4/10* (2016.01); *F21V 23/001* (2013.01); *F21V 23/008* (2013.01); *F21V 23/06* (2013.01); *F24F 5/0035* (2013.01); *H05B 45/20* (2020.01); *H05B 47/12* (2020.01); *F21W 2131/10* (2013.01); *F21Y 2115/10* (2016.08); *F24F 2221/02* (2013.01)

(58) Field of Classification Search
CPC .... F21V 33/006; F21V 23/001; F21V 23/008; F21V 23/06; F21S 4/10; F21S 2/005; H05B 47/12; H05B 45/20; F24F 5/0035; F24F 2221/02; F21Y 2115/10; F21W 2131/10
See application file for complete search history.

(56) References Cited

U.S. PATENT DOCUMENTS

| | | | | |
|---|---|---|---|---|
| 9,726,332 | B1 * | 8/2017 | May | F21K 9/275 |
| 2010/0204841 | A1 | 8/2010 | Chemel | |

(Continued)

OTHER PUBLICATIONS

Office Action dated Mar. 16, 2023 for U.S. Appl. No. 17/728,851 (pp. 1-14).

*Primary Examiner* — Henry Luong
(74) *Attorney, Agent, or Firm* — Pacer K. Udall; Stephen A. Merrill; Booth Udall Fuller, PLC

(57) ABSTRACT

A modular lighting system having a plurality of lighting units is disclosed. Each lighting unit includes a plurality of LEDs coupled to a microcontroller that is coupled to a first cable connector and a second cable connector. The system further includes a control box having a user interface, the control box communicatively coupled to each lighting unit through a plurality of cables, the plurality of lighting units and the control box all communicatively and releasably coupled to each other in series. The control box is configured to send through the first cable connector an address packet. For each lighting unit, the microcontroller is configured to adopt a first address received as a first address packet while in an addressable state, the first address being unique among the lighting units, and further configured to send a second address packet to another microcontroller after placing it in the addressable state.

20 Claims, 31 Drawing Sheets

Related U.S. Application Data application No. 16/929,668, filed on Jul. 15, 2020, now Pat. No. 11,339,963.

(51) Int. Cl.

| | |
|---|---|
| ***F24F 5/00*** | (2006.01) |
| ***H05B 45/20*** | (2020.01) |
| ***H05B 47/12*** | (2020.01) |
| *F21W 131/10* | (2006.01) |
| *F21Y 115/10* | (2016.01) |

(56) References Cited

U.S. PATENT DOCUMENTS

| | | | |
|---|---|---|---|
| 2012/0098446 | A1 | 4/2012 | Kim |
| 2016/0227629 | A1 | 8/2016 | Conner et al. |
| 2020/0137859 | A1 | 4/2020 | Yan et al. |

* cited by examiner

SYSTEM AND METHOD FOR MODULAR LIGHTING

RELATED APPLICATIONS

This application is a continuation-in-part of U.S. application Ser. No. 17/728,851 filed Apr. 25, 2022, which is a continuation of U.S. application Ser. No. 16/929,668 filed Jul. 15, 2020. The disclosures of these priority applications are hereby incorporated by reference in their entireties.

TECHNICAL FIELD

Aspects of this document relate generally to modular outdoor lighting.

BACKGROUND

Outdoor spaces such as backyards and patios can often be enhanced by transferring elements of the indoors without removing the appeal of outdoors. The beauty, appeal, and utility of such an outdoor area can be increased with the addition of elements such as lighting. Some conventional outdoor lighting systems provide a range of colors and intensities, allowing for the creation of a lighting setup tailored to a particular space or a particular function or activity, such as a party. However, bespoke conventional lighting systems can be very expensive, requiring careful installation and wiring. Such systems, though expensive and custom made, often lack features such as individually addressable lights. Once installed, rearranging the lighting units can be time consuming and expensive, sometimes requiring replacement of a portion of the system. While less expensive conventional lighting systems exist, they have their own set of drawbacks. The cost of such systems is low because they can be mass produced, with lights spaced evenly along a line, such as every two feet. Such a constraint can make such systems difficult to adapt to locations needing variable spacing between the lights.

Another common addition to outdoor areas are misting systems, which spray a fine mist of water, creating a pleasant cooling effect and making an otherwise unpleasantly hot outdoor space more comfortable. Typically, misting nozzles are located in areas where people will most often be. These areas are also logical locations for lighting. Additionally, the combination of misting and lighting can produce a desirable effect, particularly with lighting having variable color and brightness. However, such an integration would require the placement of lighting units next to, or integrated with, misting nozzles, which can only be accomplished with an expensive, rigid bespoke lighting system. Integrating a misting system with a less expensive lighting system with regularly spaced lighting units may result in misting being constrained to the regular spacing, or there may be much less integration between the two systems.

SUMMARY

Aspects of this document relate to a modular lighting system. These aspects may comprise, and implementations may include, one or more or all of the components and steps set forth in the appended CLAIMS.

In one aspect, a modular lighting system is disclosed that includes a plurality of lighting units. Each lighting unit includes: a housing; a printed circuit board (PCB) coupled to the housing, the PCB having a plurality of LEDs; a microcontroller communicatively coupled to the plurality of LEDs, a communication interface, and a power converter; and a first cable connector and a second cable connector, the first cable connector having a first power terminal communicatively coupled to a first power terminal of the second cable connector and the power converter, a second power terminal communicatively coupled to a second power terminal of the second cable connector and the power converter, a first control terminal communicatively coupled to a first control terminal of the second cable connector and the communication interface, and a second control terminal communicatively coupled to a second control terminal of the second cable connector and the communication interface, the first cable connector further having an address output terminal communicatively coupled to the microcontroller, and the second cable connector further having an address input terminal communicatively coupled to the microcontroller.

A control box is also included having a first cable connector and a user interface, the control box communicatively coupled to each lighting unit of the plurality of lighting units through a plurality of cables, the plurality of lighting units and the control box all communicatively coupled to each other in series, the control box configured to send through the first cable connector an address packet having an address and a light packet having a color value and an address, the color value having at least one of a hue and a brightness, each cable having: a first end releasably coupled to the first cable connector of one of the control box and one lighting unit; a second end releasably coupled to the second cable connector of another lighting unit; and five wires running from the first end to the second end such that the terminals of the first cable connector releasably coupled to the first end are communicatively coupled to like terminals of the second cable connector releasably coupled to the second end, with the address output terminal of the first cable connector releasably coupled to the first end of the cable being communicatively coupled to the address input terminal of the second cable connector releasably coupled to the second end of the cable; and a length.

The plurality of cables has at least two different lengths. The first cable connector, the second cable connector, the first end of each cable, and the second end of each cable are shaped such that the first end is only able to releasably couple with the first cable connector and the second end is only able to releasably couple with the second cable connector. For each lighting unit of the plurality of lighting units, the microcontroller is configured to: enter an addressable state in response to detecting a change in state at the address input terminal of the second cable connector, the change in state being a crossing of a voltage threshold; adopt a first address received through the first cable connector as a first address packet while the microcontroller is in the addressable state, the first address being unique among the plurality of lighting units; leave the addressable state, drive the address output terminal of the first cable connector to cross the voltage threshold, and send a second address packet to another microcontroller after placing the another microcontroller in the addressable state in response to adopting the first address, the second address packet having a second address different from the first address; and drive the plurality of LEDs to emit light described by the color value of a first light packet having the address adopted by the microcontroller;

The control box is configured to: store an ordered list of addresses adopted by the plurality of lighting units; and send a reset packet through the first cable connector, the microcontroller of each lighting unit of the plurality of lighting units being configured to forget the address previously adopted by the microcontroller in response to receiving the reset packet.

Particular implementations may include one or more or all of the following.

Each lighting unit of the plurality of lighting units further has a misting stem passing through the housing and PCB, the misting stem having an input end configured to releasably couple to a misting water supply line and an output end distal to the input end.

Each lighting unit of the plurality of lighting units is configured to receive a mode packet sent by the control box, the mode packet identifying a light evolution that is one of a plurality of light evolutions predefined within each lighting unit and specifying how the light emitted by the lighting unit changes over a period of time by modifying at least one of the hue and the brightness of a seed color value. The control box is further configured to periodically send a sync packet addressed to at least one lighting unit, wherein the at least one lighting unit to which the sync packet is addressed initiates the light evolution previously identified by the mode packet, and wherein the control box sends sync packets periodically with a period defined by the user interface of the control box. The seed color value is a sequence of color values defined by a plurality of light packets sent by the control box and addressed to each lighting unit of the plurality of lighting units. The plurality of light evolutions has a rain evolution that modifies the brightness of the seed color value, and wherein each sync packet sent by the control box is addressed to a random light unit.

The control box further has an audio input, and wherein the control box is configured to send sync packets addressed to a subset of the plurality of lighting units, wherein the subset is defined as a function of an audio signal received at the audio input and a position of each lighting unit in the ordered list of addresses received by the control box in address packets, relative to a center of the ordered list.

In another aspect, a modular lighting system is disclosed that includes a plurality of lighting units, each lighting unit having: a housing; a printed circuit board (PCB) coupled to the housing, the PCB having a plurality of LEDs; a microcontroller communicatively coupled to the plurality of LEDs; and a first cable connector and a second cable connector, each communicatively coupled to the microcontroller.

A control box is also included having a first cable connector and a user interface, the control box communicatively coupled to each lighting unit of the plurality of lighting units through a plurality of cables, the plurality of lighting units and the control box all communicatively coupled to each other in series, the control box configured to send through the first cable connector an address packet having an address and a light packet having a color value and an address, the color value having at least one of a hue and a brightness, each cable having: a first end releasably coupled to the first cable connector of one of the control box and one lighting unit; a second end releasably coupled to the second cable connector of another lighting unit; and a plurality of wires.

For each lighting unit of the plurality of lighting units, the microcontroller is configured to adopt a first address received through the first cable connector as a first address packet while the microcontroller is in an addressable state, the first address being unique among the plurality of lighting units, and further configured to send a second address packet to another microcontroller after placing the another microcontroller in the addressable state in response to adopting the first address, the second address packet having a second address different from the first address.

For each lighting unit of the plurality of lighting units, the microcontroller is also configured to drive the plurality of LEDs to emit light described by the color value of a first light packet having the address adopted by the microcontroller.

The control box is configured to store an ordered list of addresses adopted by the plurality of lighting units.

Particular implementations may include one or more or all of the following.

Each lighting unit of the plurality of lighting units further has a misting stem passing through the housing and PCB, the misting stem having an input end configured to releasably couple to a misting water supply line and an output end distal to the input end.

For each lighting unit of the plurality of lighting units, the microcontroller is communicatively coupled to a communication interface and a power converter. Each first cable connector and second cable connector has a first power terminal, a second power terminal, a first control terminal, and a second control terminal. For each lighting unit of the plurality of lighting units, the first power terminal of the first cable connector is communicatively coupled to the first power terminal of the second cable connector and the power converter, the second power terminal of the first cable connector is communicatively coupled to the second power terminal of the second cable connector and the power converter, the first control terminal of the first cable connector is communicatively coupled to the first control terminal of the second cable connector and the communication interface, and the second control terminal of the first cable connector is communicatively coupled to the second control terminal of the second cable connector and the communication interface. For each cable of the plurality of cables, the plurality of wires has at least four wires running from the first end to the second end such that the terminals of the first cable connector releasably coupled to the first end are communicatively coupled to like terminals of the second cable connector releasably coupled to the second end. Additionally, for each lighting unit of the plurality of lighting units, the microcontroller is configured to enter the addressable state in response to a change in state in at least one wire of one cable coupled to the lighting unit.

Each first cable connector further has an address output terminal. Each second cable connector further has an address input terminal. For each lighting unit of the plurality of lighting units, the address output terminal of the first cable connector is communicatively coupled to the microcontroller, and the address input terminal of the second cable connector is communicatively coupled to the microcontroller. For each cable of the plurality of cables, the plurality of wires has at least five wires running from the first end to the second end such that the address output terminal of the first cable connector releasably coupled to the first end of the cable is communicatively coupled to the address input terminal of the second cable connector releasably coupled to the second end of the cable. The change in state is the crossing of a voltage threshold. For each lighting unit of the plurality of lighting units, the microcontroller is configured to enter the addressable state in response to detecting the change in state at the address input terminal of the second cable connector, and is further configured to leave the addressable state and drive the address output terminal of the first cable connector to cross the voltage threshold in response to the adoption of the first address.

The control box is configured to send a reset packet through the first cable connector, wherein the microcontroller of each lighting unit of the plurality of lighting units is configured to forget the address previously adopted by the microcontroller in response to receiving the reset packet.

The first cable connector, the second cable connector, the first end of each cable, and the second end of each cable are shaped such that the first end is only able to releasably couple with the first cable connector and the second end is only able to releasably couple with the second cable connector.

Each cable has a length, and the plurality of cables has at least two different lengths.

Each lighting unit of the plurality of lighting units is configured to receive a mode packet sent by the control box, the mode packet identifying a light evolution that is one of a plurality of light evolutions predefined within each lighting unit and specifying how the light emitted by the lighting unit changes over a period of time by modifying at least one of the hue and the brightness of a seed color value. The seed color value is a sequence of color values defined by a plurality of light packets sent by the control box and addressed to each lighting unit of the plurality of lighting units. The control box further configured to periodically send a sync packet addressed to at least one lighting unit, wherein the at least one lighting unit to which the sync packet is addressed initiates the light evolution previously identified by the mode packet, and wherein the control box sends sync packets periodically with a period defined by the user interface of the control box. The plurality of light evolutions has a rain evolution that modifies the brightness of the seed color value, and wherein each sync packet sent by the control box is addressed to a random light unit.

The control box further has an audio input, and wherein the control box is configured to send sync packets addressed to a subset of the plurality of lighting units, wherein the subset is defined as a function of an audio signal received at the audio input and a position of each lighting unit in the ordered list of addresses received by the control box in address packets, relative to a center of the ordered list.

The control box further has an audio input, and wherein the control box is configured to send sync packets having an audio value that is a Fourier transform of an audio signal received at the audio input, and wherein at least one of the microcontrollers is configured to drive the plurality of LEDs coupled to the microcontroller to emit light simultaneously having a plurality of hues chosen from a predefined set of hues as a function of the audio value.

In still another aspect, a method for modular lighting is disclosed that includes: releasably coupling a control box and a plurality of lighting units together in series with a plurality of cables to form a modular lighting system, the control box having a first cable connector, each lighting unit having a microcontroller communicatively coupled to a first cable connector and a second cable connector, and each cable having a plurality of wires; initializing the assembled system by triggering the plurality of lighting units to each adopt an address that is unique among the plurality of lighting units; storing, at the control box, an ordered list of addresses adopted by the plurality of lighting units in the order the lighting units have been releasably coupled by the plurality of wires; sending a light packet from the control box to each lighting unit of the plurality of lighting units, each light packet having a color value and an address, the color value having at least one of a hue and a brightness; and driving, at each lighting unit of the plurality of lighting units, a plurality of LEDs communicatively coupled to the microcontroller to emit light described by the color value of the light packet having the address adopted by the microcontroller.

Particular implementations may include one or more or all of the following.

Coupling each lighting unit of the plurality of lighting units to a misting water supply line, wherein each lighting unit of the plurality of lighting units further has a housing and a misting stem passing through the housing and PCB of the lighting unit, the misting stem having an input end configured to releasably couple to the misting water supply line and an output end distal to the input end.

Triggering the plurality of lighting units to each adopt an address includes: placing a first lighting unit of the plurality of lighting units in an addressable state; and sending to the first lighting unit, from the control box, an address packet having an address, the first lighting unit being the lighting unit coupled directly to the control box; wherein each lighting unit of the plurality of lighting units is configured to: enter the addressable state in response to detecting a change in state in at least one wire of one cable releasably coupled to the lighting unit; adopt a first address received through the first cable connector as a first address packet while the lighting unit is in the addressable state, the first address being unique among the plurality of lighting units; place another lighting unit in the addressable state in response to adopting the first address; and send a second address packet to the another lighting unit in response to adopting the first address, the second address packet having a second address different from the first address; wherein storing the ordered list of addresses has recording the address sent to the first lighting unit and the addresses of all address packets received at the control box except for the last unique address.

The change in state is the crossing of a voltage threshold.

Initializing the system further has sending from the control box a reset packet through the first cable connector, and wherein the microcontroller of each lighting unit of the plurality of lighting units is configured to forget the address previously adopted by the microcontroller in response to receiving the reset packet.

The method may further include: receiving an instruction through a user interface of the control box; and sending from the control box through the first cable connector a mode packet based on the instruction, the mode packet identifying a light evolution that is one of a plurality of light evolutions predefined within each lighting unit; wherein, at each lighting unit of the plurality of lighting units, at least one of the hue and the brightness of the emit light emitted by the plurality of LEDs changes over a period of time, starting from a seed color value, as specified by the light evolution identified by the mode packet. Cycling the seed color value through a sequence of color values defined by a plurality of light packets sent by the control box and addressed to each lighting unit of the plurality of lighting units. Periodically sending, from the control box, a sync packet addressed to at least one lighting unit, with a period defined by the user interface of the control box; wherein the at least one lighting unit to which the sync packet is addressed initiates the light evolution identified by the mode packet in response to receiving the sync packet. The plurality of light evolutions has a rain evolution that modifies the brightness of the seed color value, and wherein each sync packet sent by the control box is addressed to a random light unit.

Each cable of the plurality of cables has a first end releasably coupled to the first cable connector of one of the control box and one lighting unit, and a second end releasably coupled to the second cable connector of another lighting unit. The first cable connector, the second cable connector, the first end of each cable, and the second end of each cable are shaped such that the first end is only able to releasably couple with the first cable connector and the second end is only able to releasably couple with the second cable connector. Each cable has a length, and the plurality of cables has at least two different lengths.

The method may further include: receiving an audio signal through an audio input of the control box; and sending, from the control box, sync packets addressed to a subset of the plurality of lighting units, wherein the subset is defined as a function of the audio signal received at the audio input and a position of each lighting unit in the ordered list of addresses received by the control box in address packets, relative to a center of the ordered list.

The method may further include: receiving an audio signal through an audio input of the control box; and sending, from the control box, sync packets having an audio value that is a Fourier transform of the audio signal; wherein at least one of the microcontrollers is configured to drive the plurality of LEDs coupled to the microcontroller to emit light simultaneously having a plurality of hues chosen from a predefined set of hues as a function of the audio value.

In still another aspect, a modular lighting system includes a first lighting unit and a second lighting unit. The first lighting unit includes one or more light emitting diodes and a cable connector that includes a first set of pins. The second lighting unit includes one or more light emitting diodes and a cable connector that includes a second set of pins. The modular lighting system also includes a cable that connects the cable connector of the first lighting unit to the cable connector of the second lighting unit. The cable includes a first end, a second end, and a plurality of wires. The first end has a first set of sockets that is configured to interface with the first set of pins of the cable connector of the first lighting unit, and the second end has a second set of sockets that is configured to interface with the second set of pins of the cable connector of the second lighting unit. The plurality of wires connects the first set of sockets with the second set of sockets. The first set of pins includes one pin that is longer than every other pin in the first set of pins.

In some embodiments, the first set of pins includes six pins. In some embodiments, a subset of the first set of pins is configured to convey power. In some embodiments, the subset of the first set of pins includes two pins. In some embodiments, the subset of the first set of pins includes pins having a thickness of 1.5 millimeters. In some embodiments, the subset of the first set of pins includes the one pin that is longer than every other pin in the first set of pins.

In some embodiments, a subset of the first set of pins is configured to convey communication signals. In some embodiments, the subset of the first set of pins includes four pins. In some embodiments, the subset of the first set of pins includes pins having a thickness of 1 millimeter.

In some embodiments, the plurality of wires includes six wires. In some embodiments, the cable includes a foil wrapped around at least two wires of the plurality of wires. In some embodiments, the foil is wrapped around five wires of the plurality of wires. In some embodiments, at least one wire of the plurality of wires is disposed exterior to and in contact with the foil. In some embodiments, the at least one wire of the plurality of wires is non-insulated.

In still another aspect, a cable for a modular lighting system includes a first end, a second end, a plurality of wires, and a foil wrapped around a subset of the plurality of wires. The first end has a first set of sockets that is configured to interface with a first set of pins of a cable connector of a first lighting unit. The second end has a second set of sockets that is configured to interface with a second set of pins of a cable connector of a second lighting unit. The plurality of wires connects the first set of sockets with the second set of sockets.

In some embodiments, the plurality of wires includes six wires. In some embodiments, the subset of the plurality of wires includes five wires. In some embodiments, two of the five wires are twisted together. In some embodiments, at least one wire of the plurality of wires is disposed exterior to and in contact with the foil. In some embodiments, the first set of sockets comprises six sockets.

The foregoing and other aspects, features, and advantages will be apparent to those artisans of ordinary skill in the art from the DESCRIPTION and DRAWINGS, and from the CLAIMS.

Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

BRIEF DESCRIPTION OF THE DRAWINGS

The disclosure will hereinafter be described in conjunction with the appended drawings, where like designations denote like elements, and.

Figure 9:
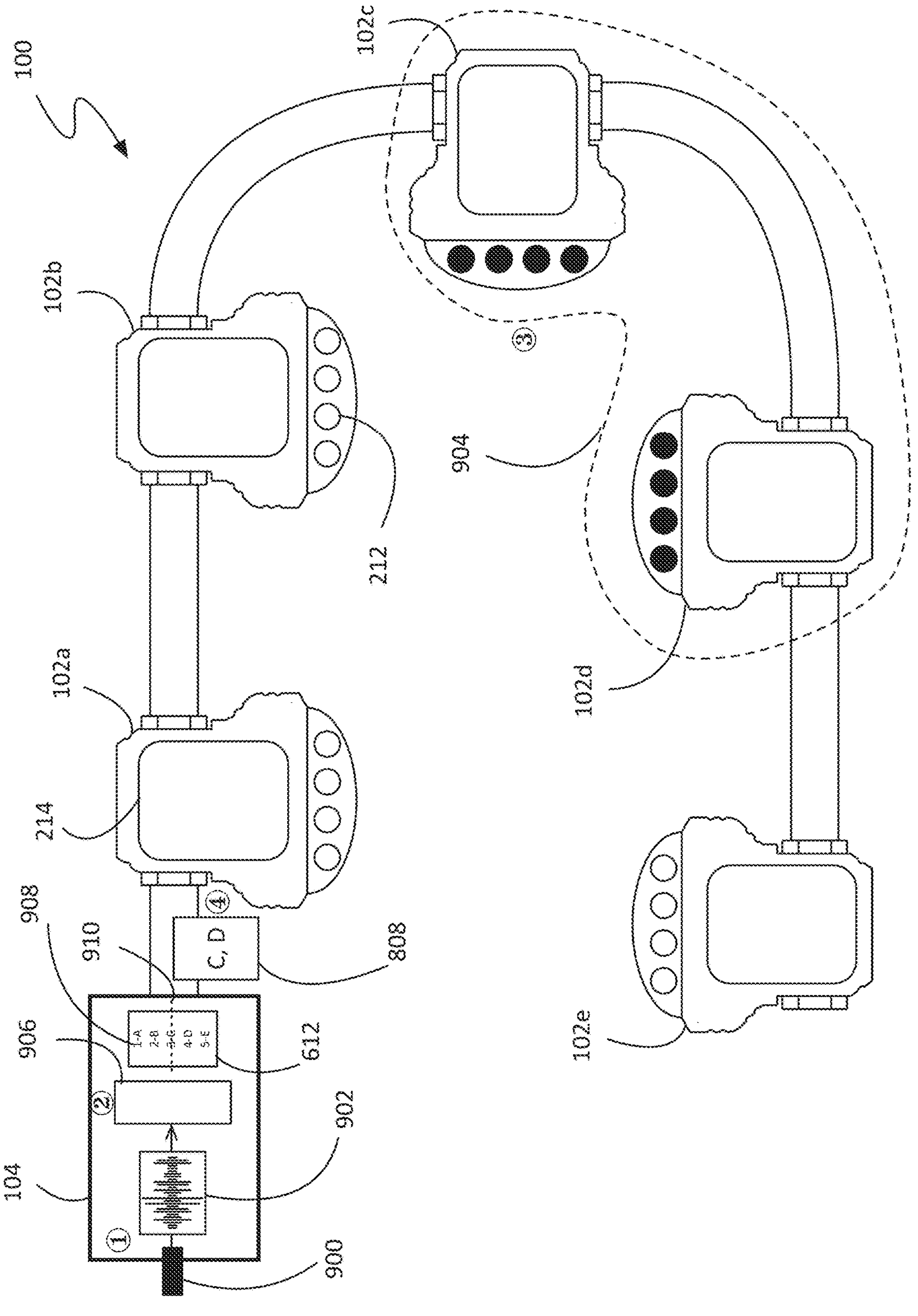
Figure 10:
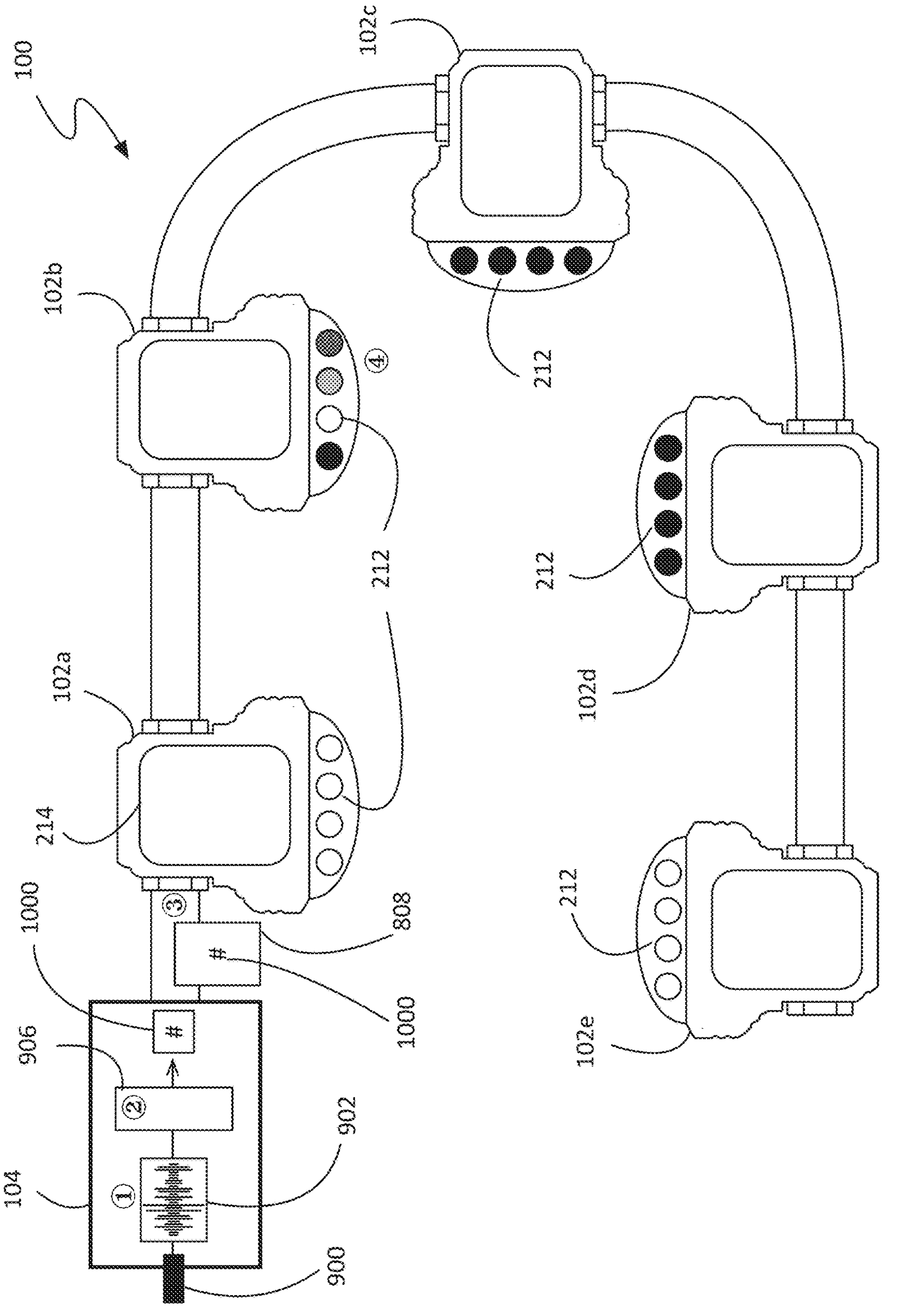
Figure 11:
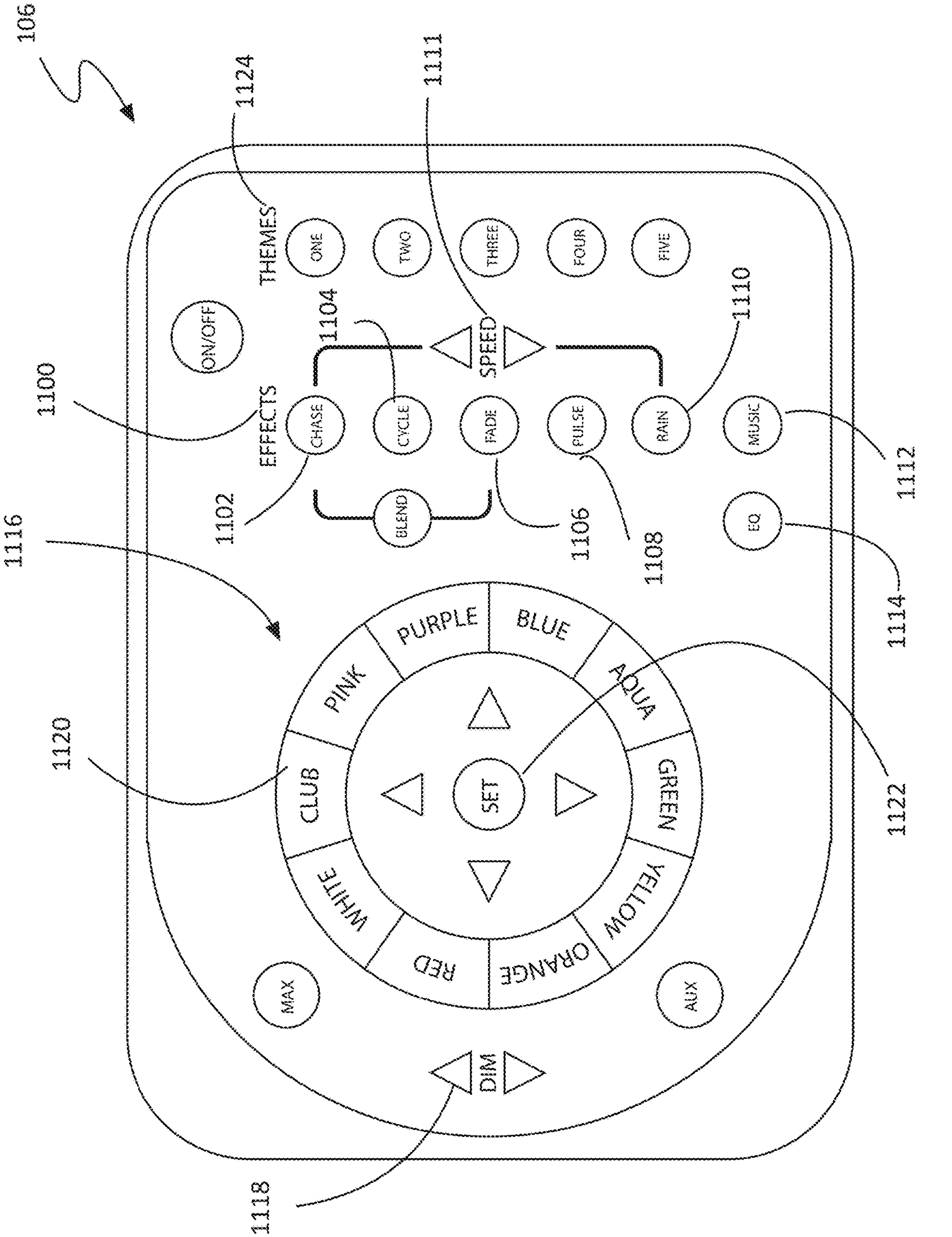
Figure 12:
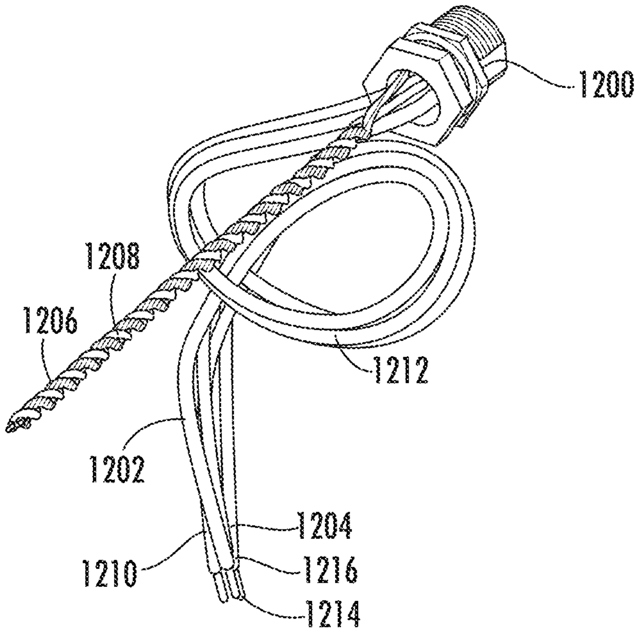
Figure 13:
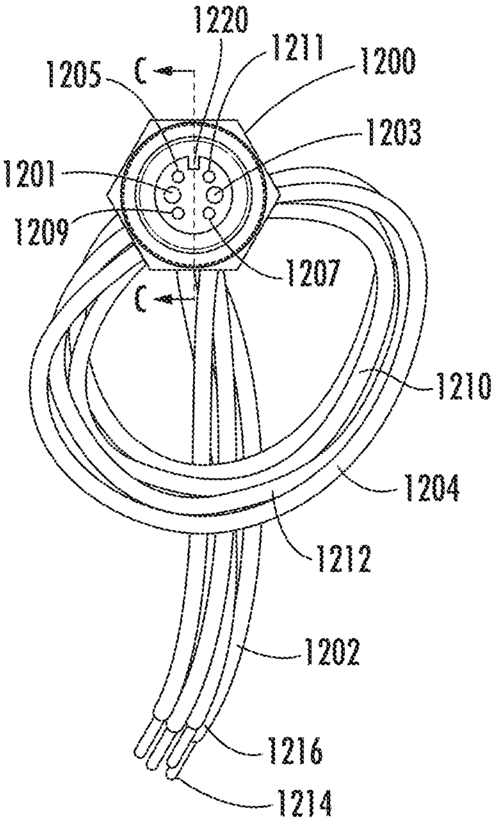
Figure 14:
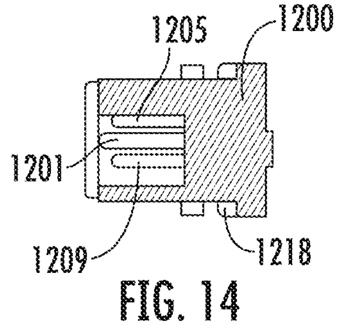
Figure 15:
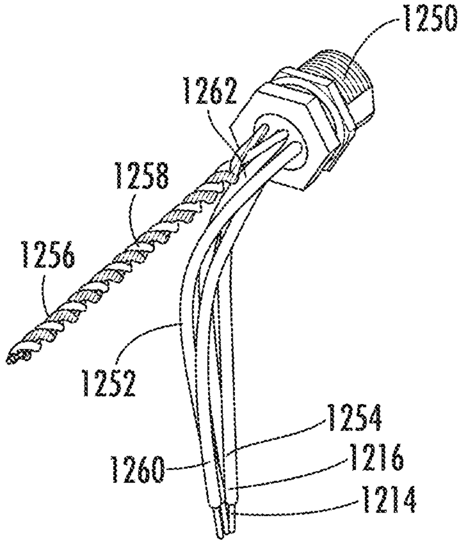
Figure 16:
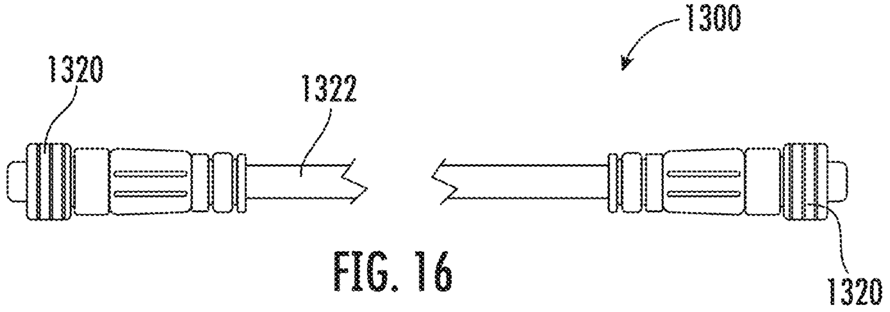
Figure 17:
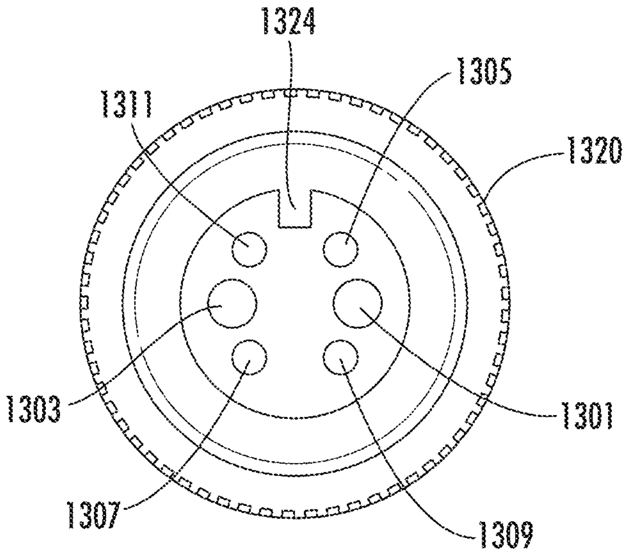
Figure 18:
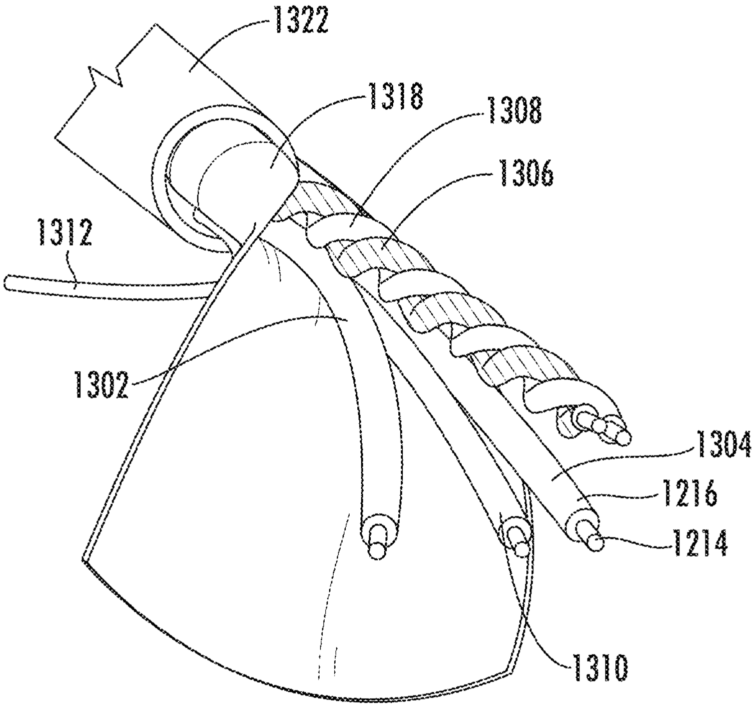

FIG. *8a* is a process flow of a modular lighting system implementing a mode;

FIG. *8b* is a schematic view of exemplary light evolutions of single lighting unit;

FIG. *8c* is a schematic view of exemplary light evolutions of multiple lighting units in a modular lighting system;

FIGS. 9 and 10 are process flows of a modular lighting system implementing audio modes;

FIG. 11 is a front view of an exemplary user interface for a control box;

FIG. 12 is a perspective view of a cable connector of a control box according to some embodiments;

FIG. 13 is a front view of a cable connector of a control box according to some embodiments;

FIG. 14 is a cross-sectional view of the cable connector of FIG. 13, along line C-C, according to some embodiments;

FIG. 15 is a perspective view of a cable connector of a lighting unit according to some embodiments;

FIG. 16 is a side view of a portion of a cable according to some embodiments;

FIG. 17 is a front view of an end of a cable according to some embodiments; and FIG. 18 is an exposed view of a portion of a cable according to some embodiments.

Figure 19A:
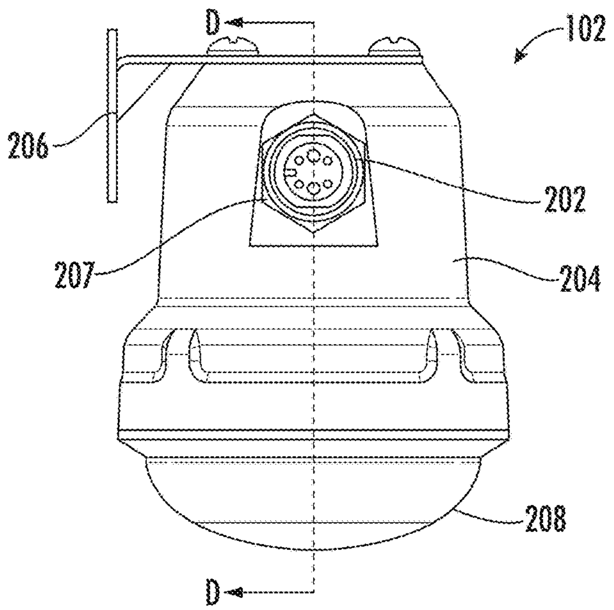

FIG. 19A is a side view of a lighting unit according to some embodiments.

Figure 19B:
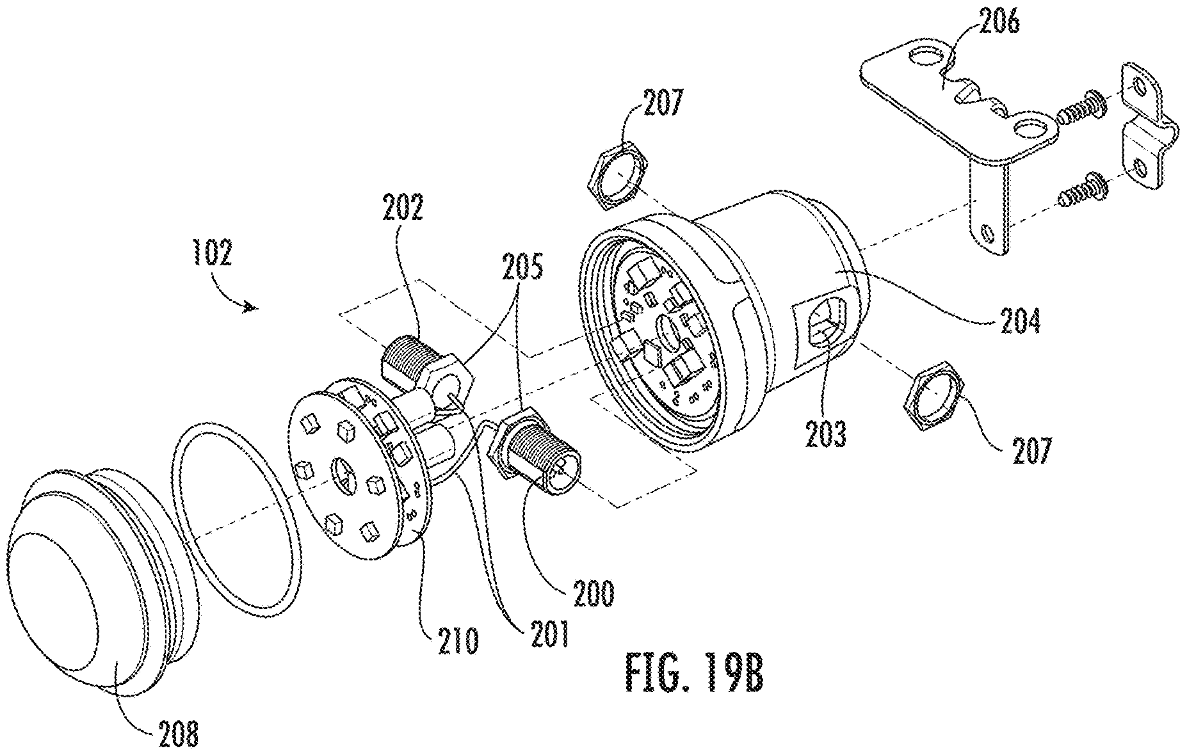

FIG. 19B is an exploded view of a lighting unit according to some embodiments.

Figure 19C:
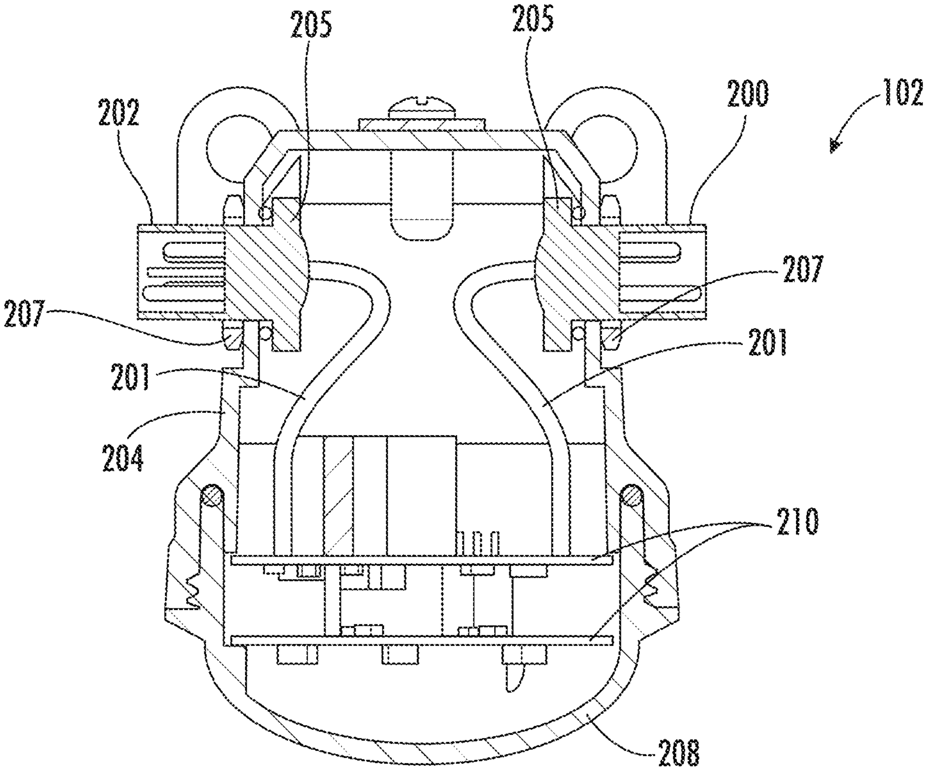

FIG. 19C is a cross-section view along line D-D in FIG. 19A of a lighting unit according to some embodiments.

Figure 20A:
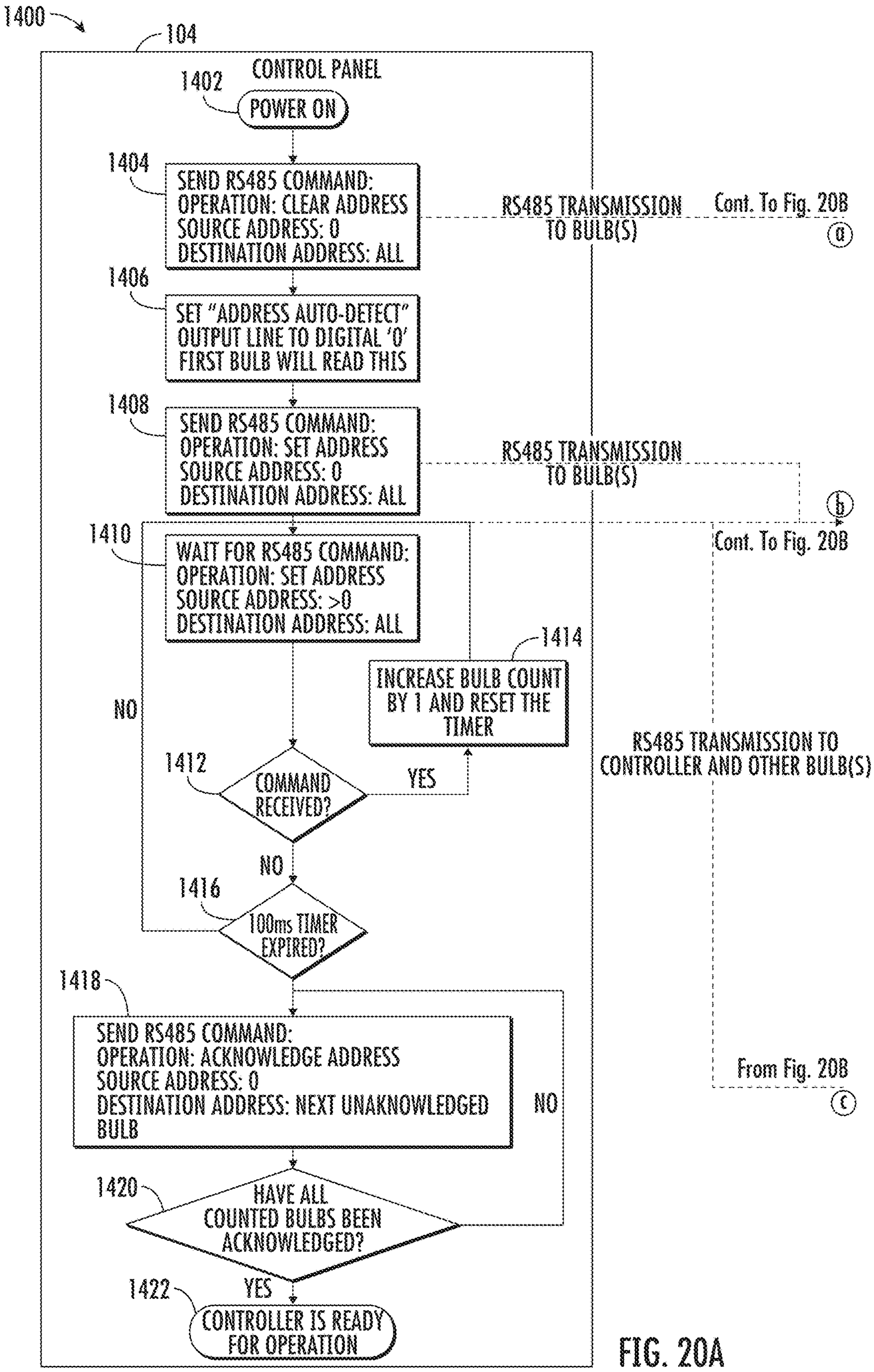
Figure 20B:
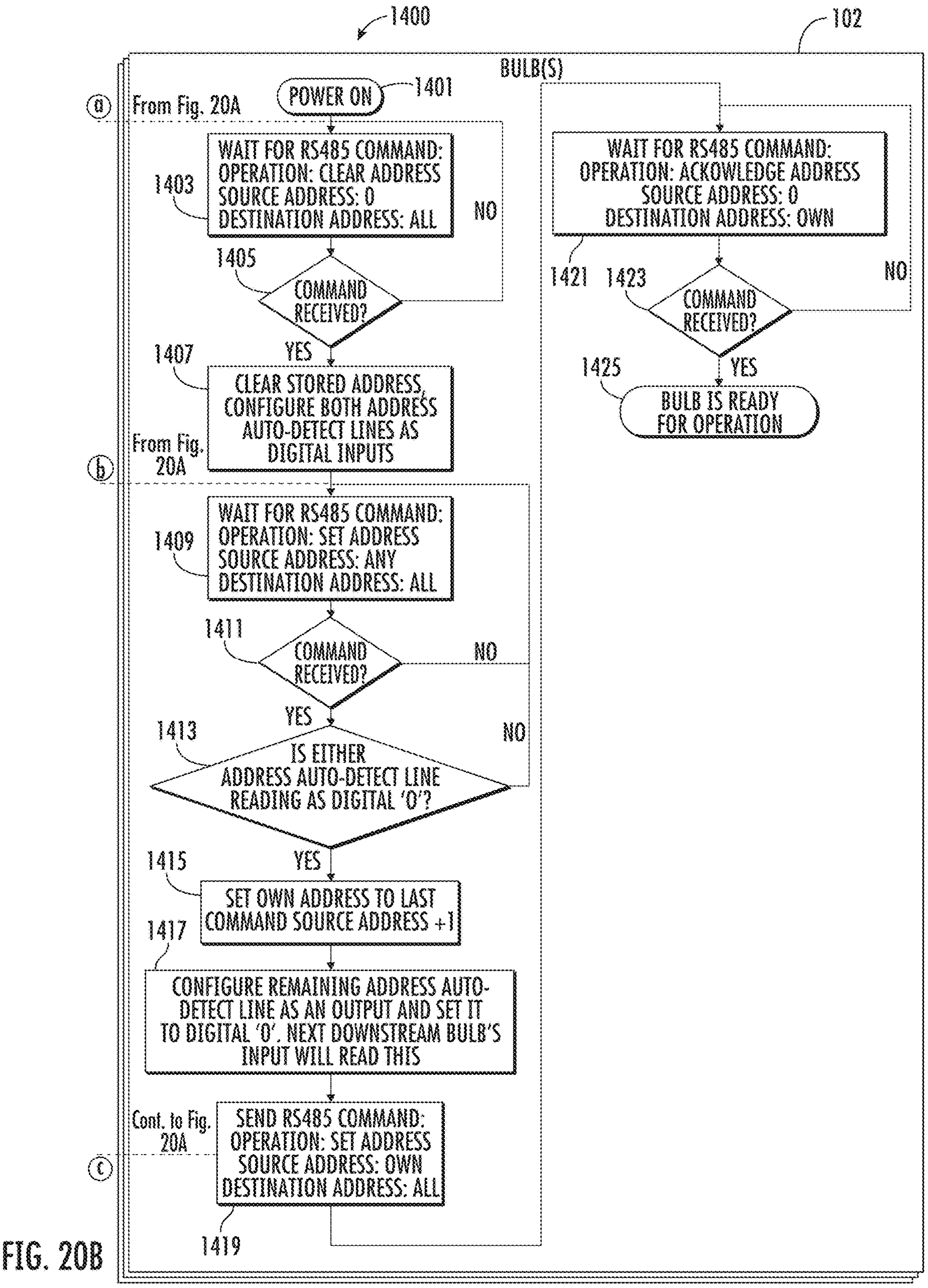

FIGS. 20A-20B show a process flow of a modular lighting system for automatically addressing lighting units according to some embodiments.

Figure 21:
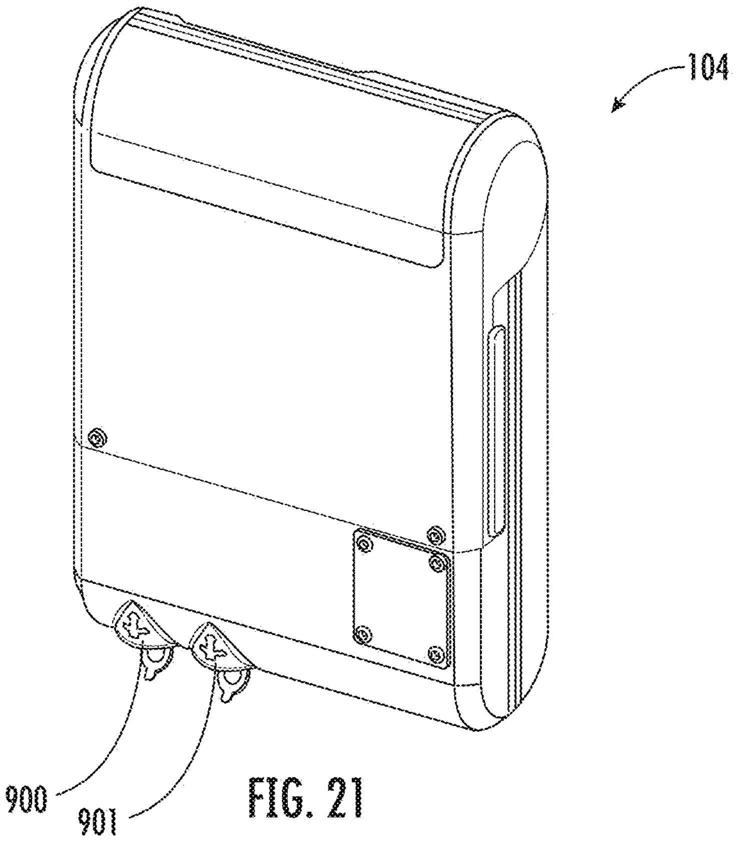

FIG. 21 is a perspective view of a control box according to some embodiments.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word “exemplary,” “example,” or various forms thereof are used herein to mean serving as an example, instance, or illustration. Any aspect or design described herein as “exemplary” or as an “example” is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Outdoor spaces such as backyards and patios can often be enhanced by transferring elements of the indoors without removing the appeal of outdoors. The beauty, appeal, and utility of such an outdoor area can be increased with the addition of elements such as lighting.

Some conventional outdoor lighting systems provide a range of colors and intensities, allowing for the creation of a lighting setup tailored to a particular space or a particular function or activity, such as a party. However, bespoke conventional lighting systems can be very expensive, requiring careful installation and wiring. Such systems, though expensive and custom made, often lack features such as individually addressable lights. Once installed, rearranging the lighting units can be time consuming and expensive, sometimes requiring replacement of a portion of the system.

While less expensive conventional lighting systems exist, they have their own set of drawbacks. The cost of such systems is low because they can be mass produced, with lights spaced evenly along a line, such as every two feet. Such a constraint can make such systems difficult to adapt to locations needing variable spacing between the lights.

Another common addition to outdoor areas are misting systems, which spray a fine mist of water, creating a pleasant cooling effect and making an otherwise unpleasantly hot outdoor space more comfortable. Typically, misting nozzles are located in areas where people will most often be. These areas are also logical locations for lighting. Additionally, the combination of misting and lighting can produce a desirable effect, particularly with lighting having variable color and brightness. However, such an integration would require the placement of lighting units next to, or integrated with, misting nozzles, which can only be accomplished with an expensive, rigid bespoke lighting system. Integrating a misting system with a less expensive lighting system with regularly spaced lighting units may result in misting being constrained to the regular spacing, or there may be much less integration between the two systems.

Contemplated herein is a system and method for modular lighting. The contemplated modular lighting system (hereinafter "lighting system" or "system") comprises a plurality of lighting units that are individually addressable and able to provide a wide range of functionality, customization, and effects. However, unlike conventional lighting solutions with individually addressable lights, the lighting units of the system contemplated herein are also modular, able to be rearranged at will and deployed in any desired configuration.

Unlike conventional outdoor lighting solutions, the systems contemplated herein are not limited to lights equally spaced along a fixed wire. This adaptability allows some embodiments to be integrated with a misting system, having a water delivery conduit, or misting stem, that passes through the center of each lighting unit, terminating in a misting nozzle surrounded by LEDs.

Within the systems contemplated herein, lighting units may be fungible, able to be swapped with each other, or replaced as needed, without having to manually reprogram the system. The system is able to adapt itself to new, different, and/or additional lighting units, automatically, according to various embodiments. Because the system may be assembled from a collection of identical lighting units, they may be mass produced. This allows the system to have greater functionality than the conventional bespoke lighting systems while also enjoying the cost benefits of the mass producibility of conventional off-the-shelf lighting solutions involving rigid, equal spacing of the lights.

It should be noted that while the following discussion will focus on non-limiting examples having lighting units with a particular form factor, those skilled in the art will recognize that the methods and systems contemplated herein may be adapted to other types of lighting units and lighting systems, including but not limited to indoor systems.

Figure 1A:
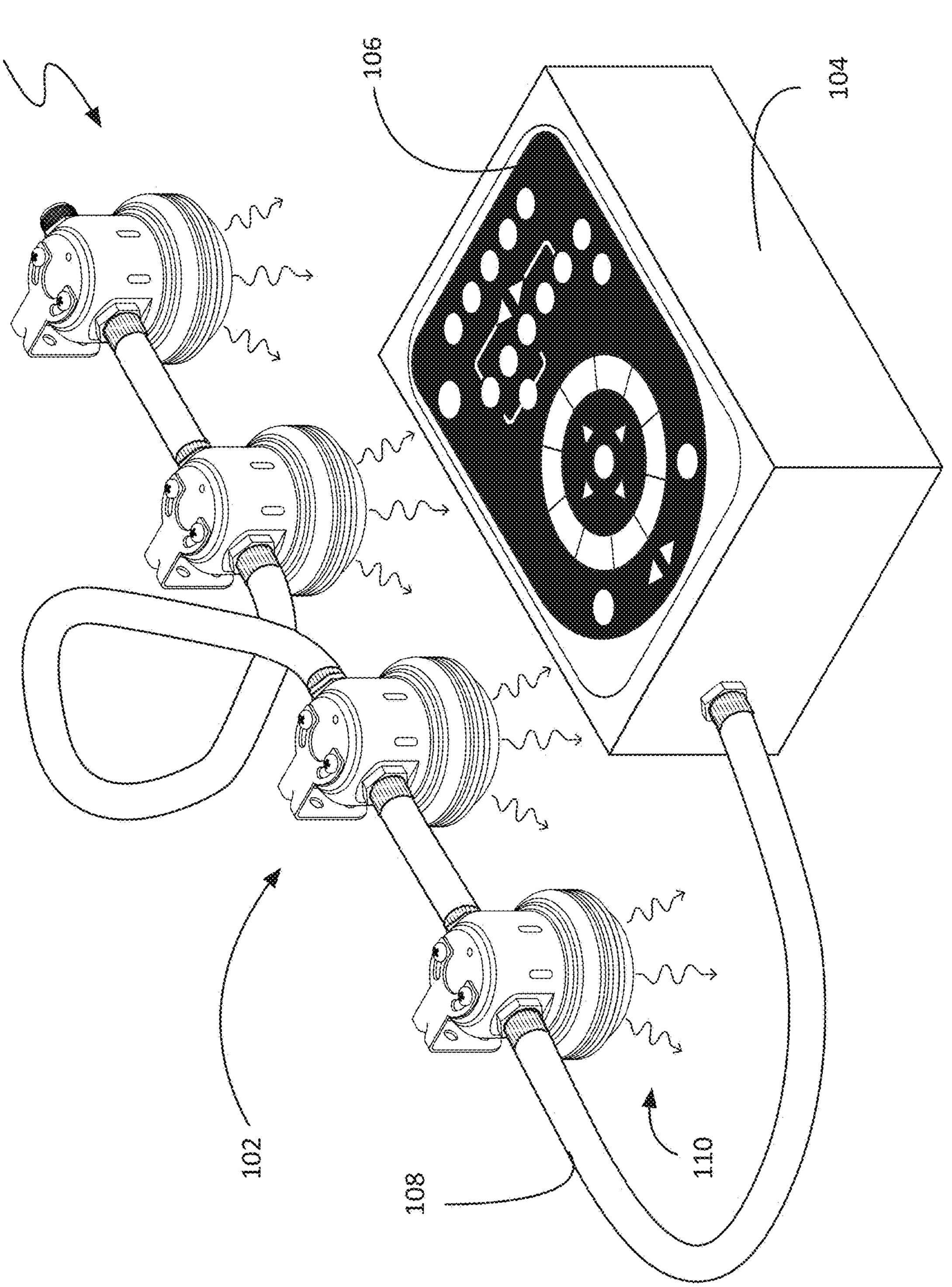
FIG. 1A is a perspective view of a modular lighting system.

FIG. 1A is a perspective view of a non-limiting example of a modular lighting system. As shown, the system 100 comprises a plurality of lighting units 102, connected to each other in series by a plurality of cables 108. The lighting units 102 are connected to, and controlled by, a control box 104, according to various embodiments. The control box 104 provides power and instructions to the lighting units 102, causing them to emit light 110.

According to various embodiments, the plurality of lighting units 102 and the cables 108 that connect them are outdoor rated, able to withstand exposure to a range of weather conditions and temperatures. In some embodiments, the control box 104 may also be weather-proof, while in other embodiments the control box 104 may need to be sheltered, either indoors, or within a secondary housing.

As shown, the control box 104 comprises a user interface 106. The control box 104 will be discussed in greater detail with respect to FIG. 6, and the user interface 106 will be discussed in greater detail with respect to FIG. 11, below.

It should be noted that while FIG. 1A shows a system 100 having four lighting units 102, other embodiments may comprise many more. For example, in one embodiment, the system 100 may have up to 80 lighting units. Other embodiments may have more, or less. According to various embodiments, the number of lighting units 102 a system 100 may include is dependent upon the nature of the power supplied by the control box 104. Lighting units 102 will be discussed in much greater detail with respect to FIGS. 2A-2F, below. Additionally, cables 108 will be discussed further with respect to FIG. 5, below.

Figure 1B:
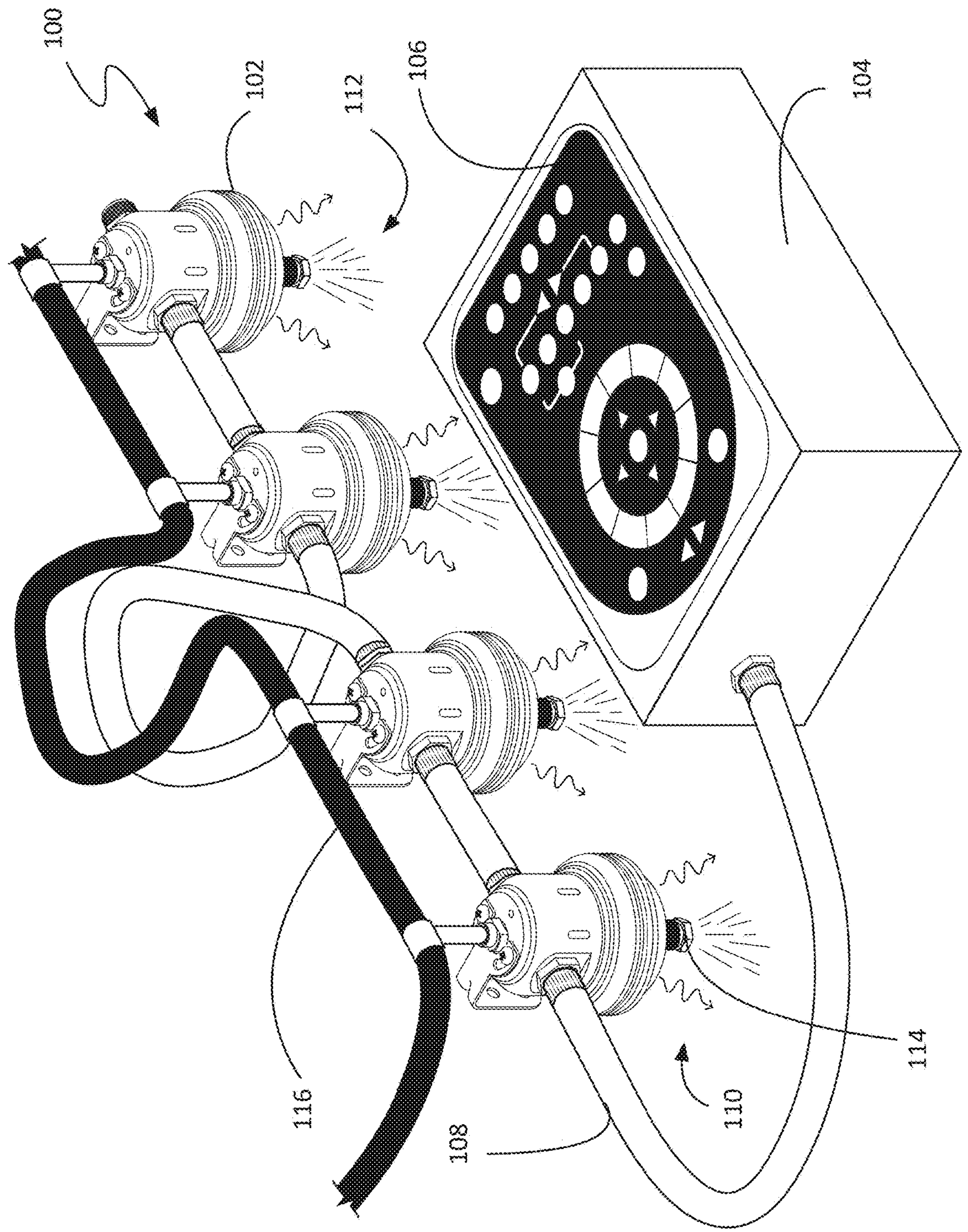
FIG. 1B is a perspective view of a modular lighting system with misting system integration.

FIG. 1B is a perspective view of a non-limiting example of a modular lighting system with misting system integration. As shown, in this system 100 each lighting unit 102 comprises a misting stem 114 that is coupled to a misting water supply line 116. This allows each lighting unit 102 to emit both light 110 and mist 112.

In the context of the present description and the claims that follow, a misting water supply line 116 is a line that provides water to a misting system, and may be coupled to a water source and, in some embodiments, a pump. According to various embodiments, the misting lighting units 102 contemplated herein may be adapted for use with any conventional outdoor misting solution. In some embodiments, the system 100 may be integrated with a conventional misting system that has already been installed, simply replacing the misting nozzles with lighting units having misting stems, as shown in FIG. 1B.

Figure 2A:
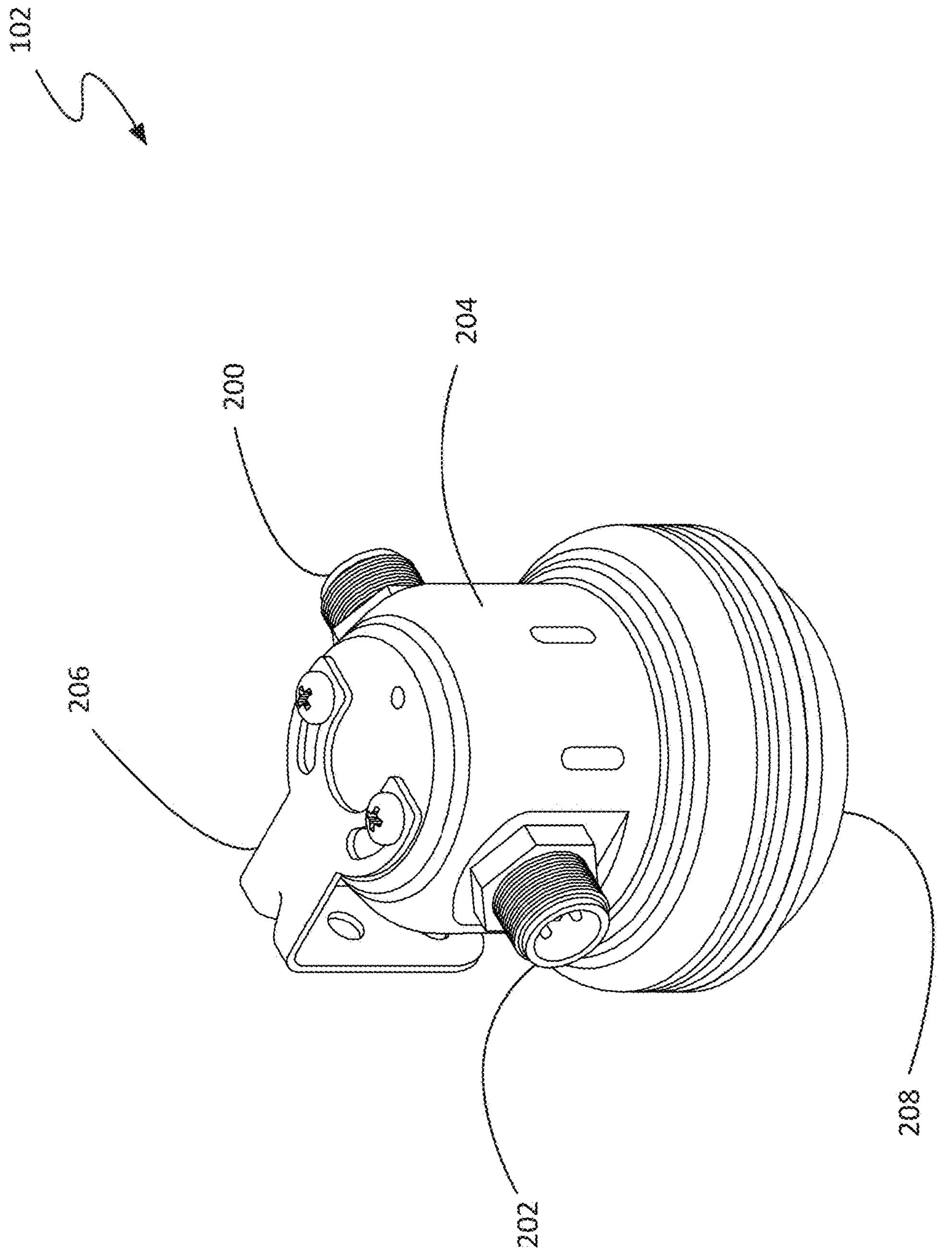
FIGS. 2A-2E are perspective, exploded, top, side, and front views, respectively, of a lighting unit.
Figure 2B:
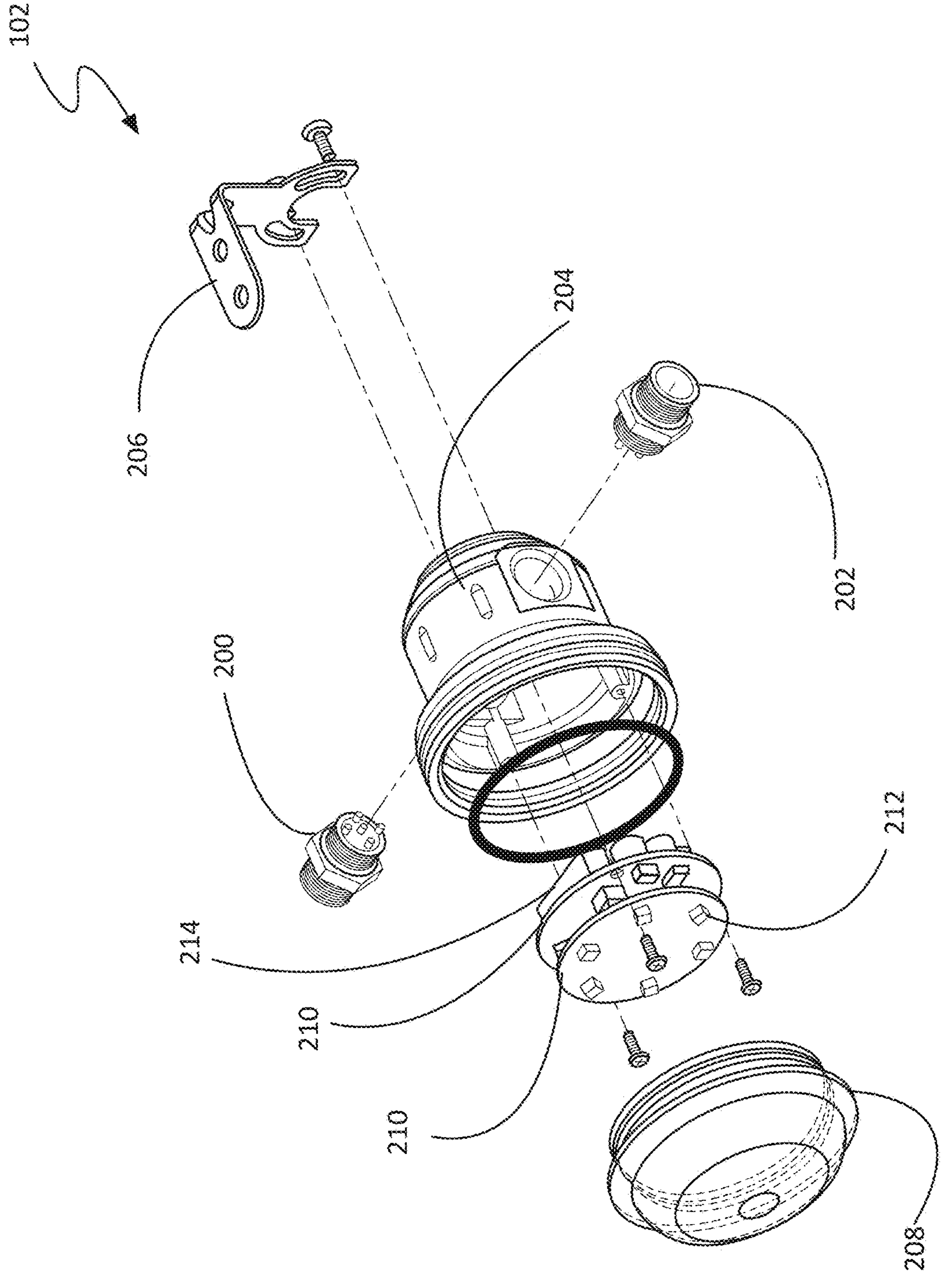
Figure 2C:
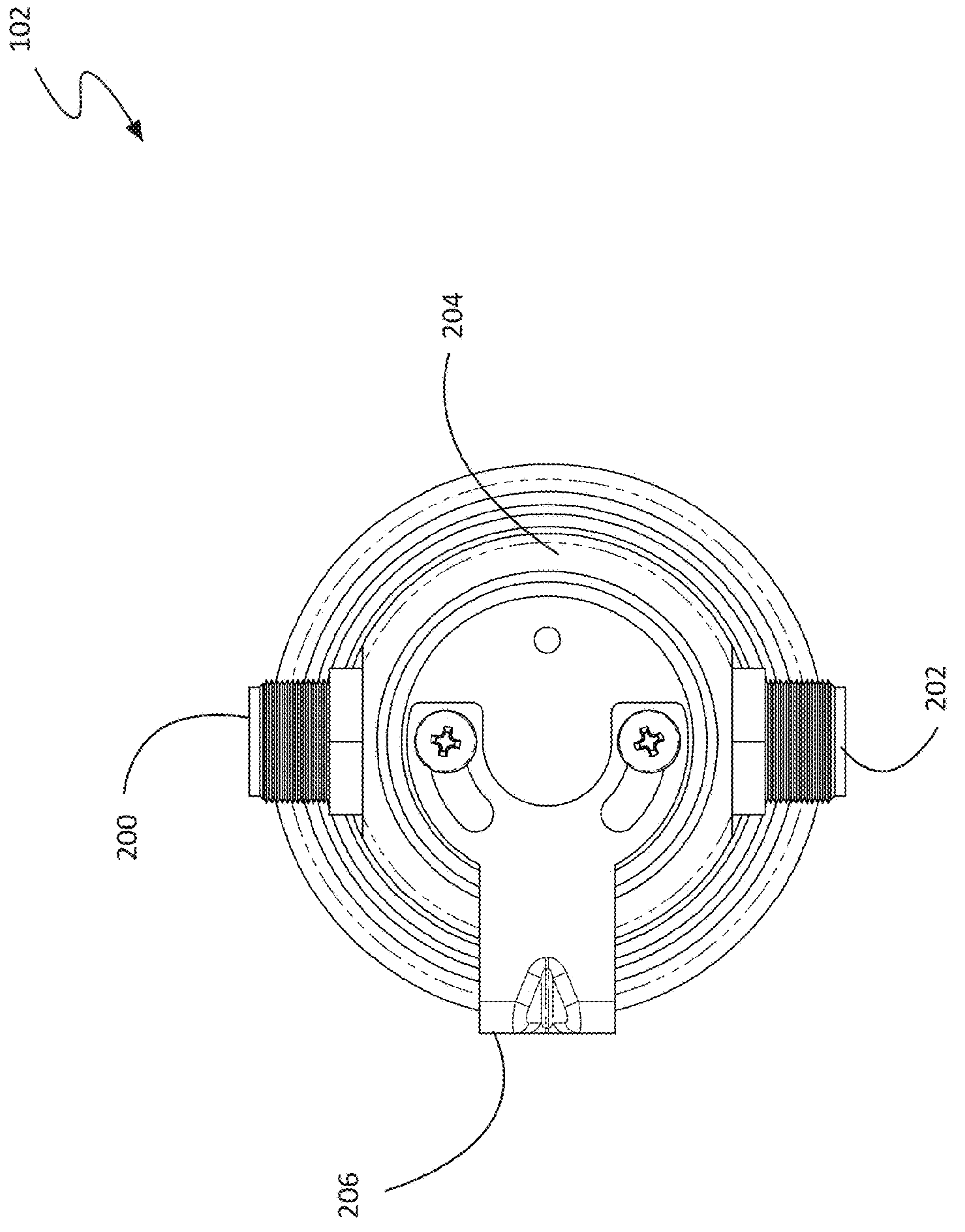
Figure 2D:
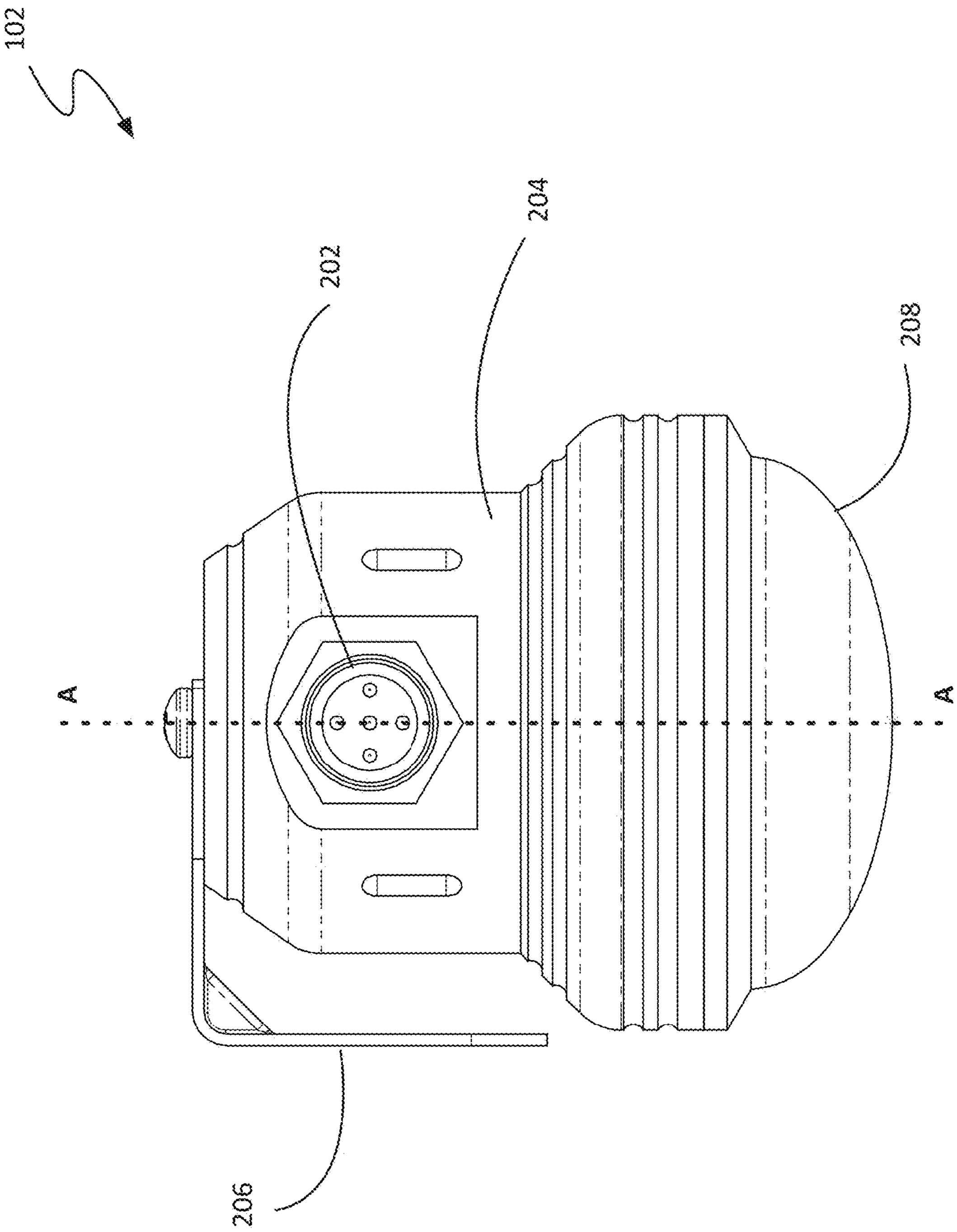
Figure 2E:
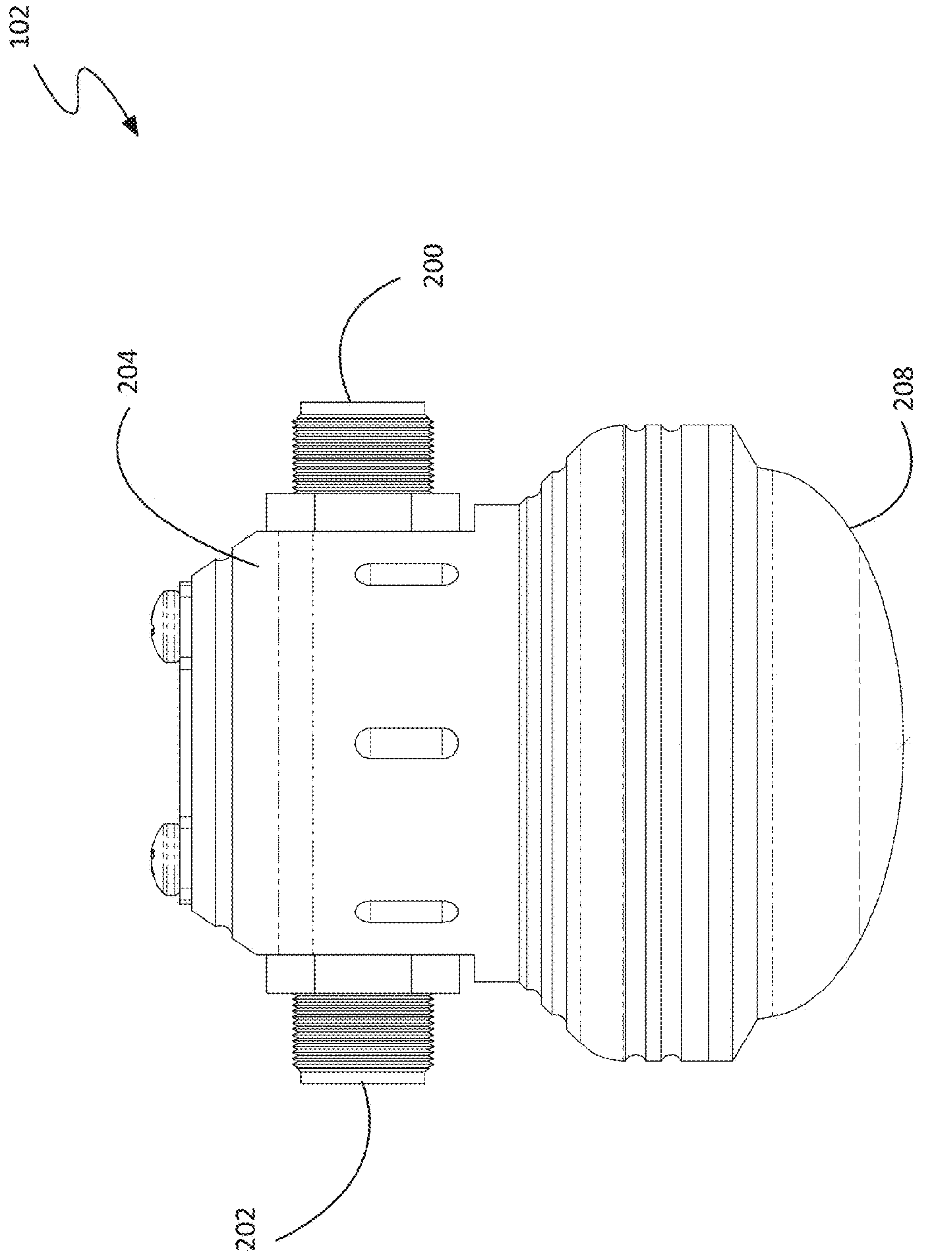
Figure 2F:
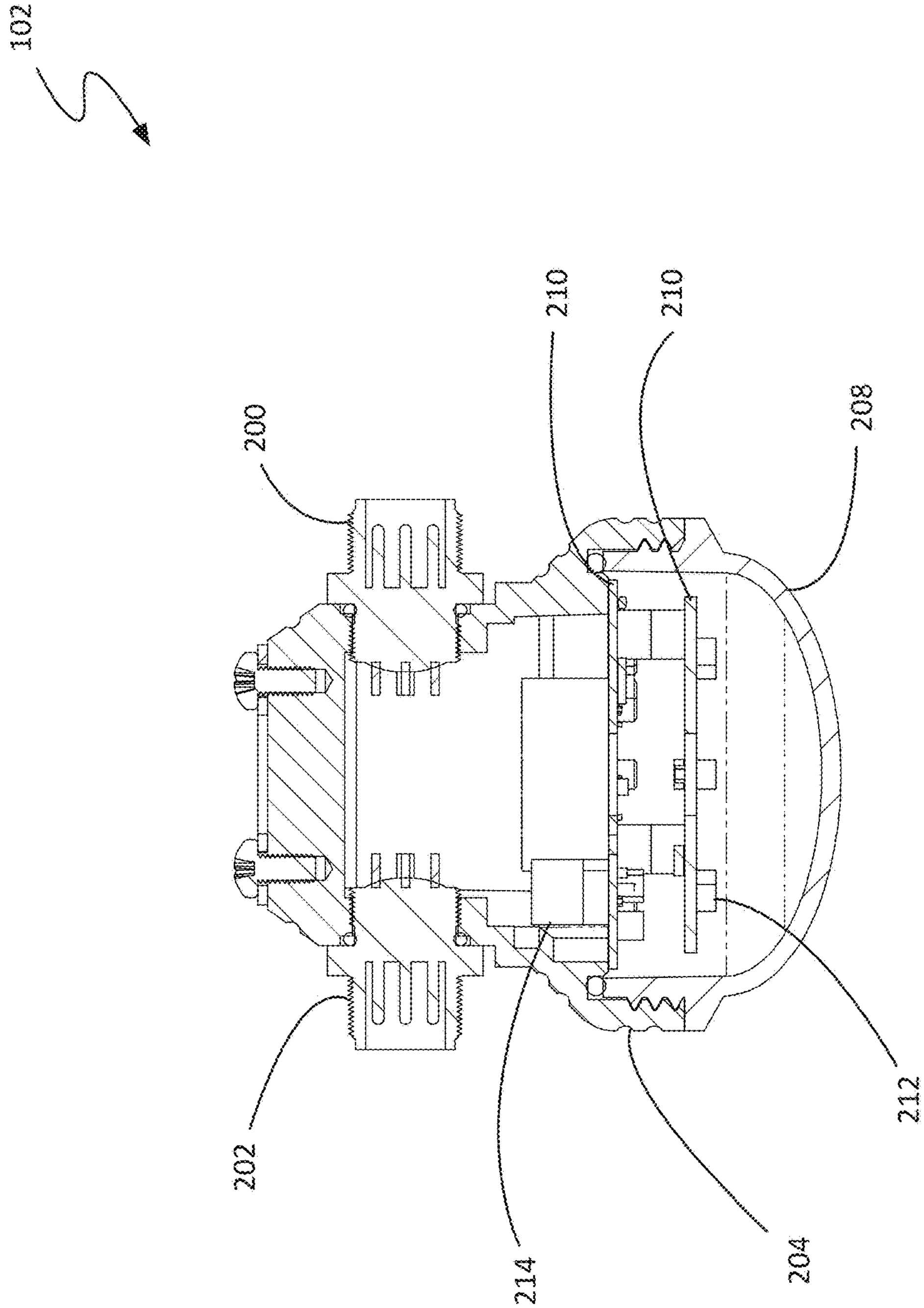
FIG. 2F is a cross-sectional view of the lighting unit of FIG. 2D, along line A-A.

It should be noted that while FIG. 1B shows a system with all of the lighting units 102 having misting stems 114, in other embodiments the system may comprise lighting units 102 that are all non-misting, while in still other embodiments, a system 100 may have both misting and non-misting lighting units 102, allowing it to be adapted to a wider range of use scenarios. Misting stems 114, and misting lighting units 102, will be discussed in greater detail with respect to FIGS. 3A-3E, below FIGS. 2A-2F are various views of a non-limiting example of a lighting unit 102. Specifically, FIG. 2A is a perspective view, FIG. 2B is an exploded perspective view, FIG. 2C is a top view, FIG. 2D is a side view, and FIG. 2E is a front view. FIG. 2F is a cross-sectional view of the lighting unit 102, taken along line A-A of FIG. 2D.

As shown, each lighting unit 102 comprises a housing 204, a first cable connector 200, a second cable connector 202, a light cover 208 or lens, a printed circuit board 210 (hereinafter PCB 210), a plurality of LEDs 212, and a microcontroller 214.

According to various embodiments, the housing 204 encloses the sensitive components of the lighting unit 102, protecting them from outdoor exposure, and making the unit more aesthetically pleasing. In some embodiments, the housing 204 may also serve as a heat sink for heat generated by the electronic components, particularly the LEDs.

The housing 204 may be constructed of any material compatible with outdoor use. For example, in one embodiment, the housing 204 may be aluminum. As an option, the housing 204 may be machined from a single piece of material. Other examples include, but are not limited to, other metals, plastics, thermoplastics, and any other material known in the art of outdoor fixtures.

The housing 204 may have a wide range of shapes including, but not limited to, a traditional "bulb-like" shape like the non-limiting example of FIG. 2A, spherical, cylindrical, and the like. The housing 204 may be sized to accommodate a wide range of internal components. As a specific example, in one embodiment, the housing 204 may be roughly 50 mm wide on a wide end, roughly 35 mm wide at a narrow end, and may be roughly 43 mm tall. Those skilled in the art will recognize that the size and/or shape of the housing 204 may be adapted for a wide range of applications and form factors.

The light cover 208 is coupled to the housing 204, and serves to protect the internal components of the lighting unit 102. According to various embodiments, the light cover 208 is at least translucent, allowing light 110 to pass through to illuminate the surrounding area. In some embodiments, the light cover 208 may be frosted or otherwise translucent, providing a more diffuse light. In other embodiments, the light cover 208 may be clear, and may comprise a lensed portion to focus the light 110 in a particular area beneath the lighting unit 102.

In still other embodiments, the light cover 208 may have both translucent and substantially transparent segments. As a specific example, in one embodiment, the light cover 208 may have a clear spotlight area around the center, with a frosted diffuse surface around the perimeter. As an option, the central area may be polished, while the surrounding perimeter may be bead-blasted to achieve a frosted look. In some embodiments, the light cover 208 may be composed of acrylic. In other embodiments, the light cover 208 may comprise some other plastic, or other material appropriate for outdoor use and at the least transparent.

As shown in FIG. 2B, in some embodiments, the light cover 208 may be threaded, and may be releasably coupled to the housing 204. As an option, in some embodiments, a lighting unit 102 may have interchangeable light covers 208, allowing some units to have a diffuse look while others may provide a spotlight focused on a smaller area. In other embodiments, the light cover 208 may be affixed to the housing 204, aiding in making the unit 102 waterproof.

As shown in the top view of FIG. 2C, in some embodiments of the lighting unit 102, the housing 204 may have holes in the top, permitting the attachment of various brackets 206 or other mounting hardware or adapters. These holes may be just surface deep in some embodiments, not exposing the interior of the housing 204. In some embodiments, the lighting unit 102 may be adaptable for various mounting brackets 206 including, but not limited to, hooks (e.g. hanging from a wire or pipe, etc.), mounting plates to be coupled to a surface, ball-and-socket mounts allowing the lighting unit 102 to be held in a desired orientation, and the like.

Each lighting unit 102 comprises at least one PCB 210 inside the housing 204. The internal electronic components, such as the LEDs 212 and the microcontroller 214 are mounted on a PCB 210. In some embodiments, these components may all be mounted on the same PCB 210. In other embodiments, the lighting unit 102 may comprise more than one PCB 210, which may allow the lighting unit 102 to have a narrower shape, or smaller diameter. As a specific example, in one embodiment, the lighting unit 102 may have two PCBs 210, one PCB 210 comprising the LEDs 212, and the other comprising control components such as the microcontroller 214. As an option, these two PCBs 210 may be communicatively coupled to each other through connectors.

Each lighting unit 102 comprises one or more light emitting diodes (LEDs) 212. In the non-limiting example shown in FIG. 2B, the lighting unit 102 comprises six LEDs 212 mounted on a PCB 210. Other embodiments may make use of more LEDs, or fewer LEDs, depending on the application, the power available, and the materials used in the lighting unit 102 (e.g. able to withstand the heat generated by the LEDs, etc.).

In the context of the present description and the claims that follow, an LED type may refer to the wavelength/color or range of wavelengths/colors the LED is able to emit, the range of intensities the LED is able to emit, or both. Examples include, but are not limited to, RGB LEDs, white LEDs, single color LEDs, and the like.

In some embodiments, the colors and/or brightness levels available may be limited by the capabilities of the LED driver (i.e. microcontroller 214). As a specific example, in one embodiment, the lighting unit 102 is able to emit 8 different colors, having 20 shades each, yielding 160 different tones.

In some embodiments, the LEDs 212 may all be identical, while in other embodiments the lighting unit 102 may comprise more than one kind of LED 212. For example, in one embodiment, the lighting unit 102 may comprise a plurality of RGB LEDs 212, and a single, high intensity infrared LED 212, allowing the lighting unit 102 to provide lighting for people in the outdoor venue, and later provide illumination to security cameras.

Each lighting unit 102 comprises a microcontroller 214 communicatively coupled to the plurality of LEDs 210. In the context of the present description and the claims that follow, a microcontroller 214 refers to a programmable device able to drive the LEDs 210 and receive instructions from the control box 104. It is assumed that the microcontroller 214 comprises either on-board memory, or is coupled to memory capable of storing instructions. Those skilled in the art will recognize that the role of microcontroller 214 could be filled by a processor and memory, or other components known in the art.

As shown, each lighting unit 102 also comprises a first cable connector 200 and a second cable connector 202, both communicatively coupled to at least the microcontroller 214. In some embodiments, the cable connectors may be composed of aluminum. In other embodiments, the cable connectors may be composed of plastic, or other material known in the art. The cable connectors will be discussed in greater detail with respect to FIGS. 4 and 5, below.

Figure 3A:
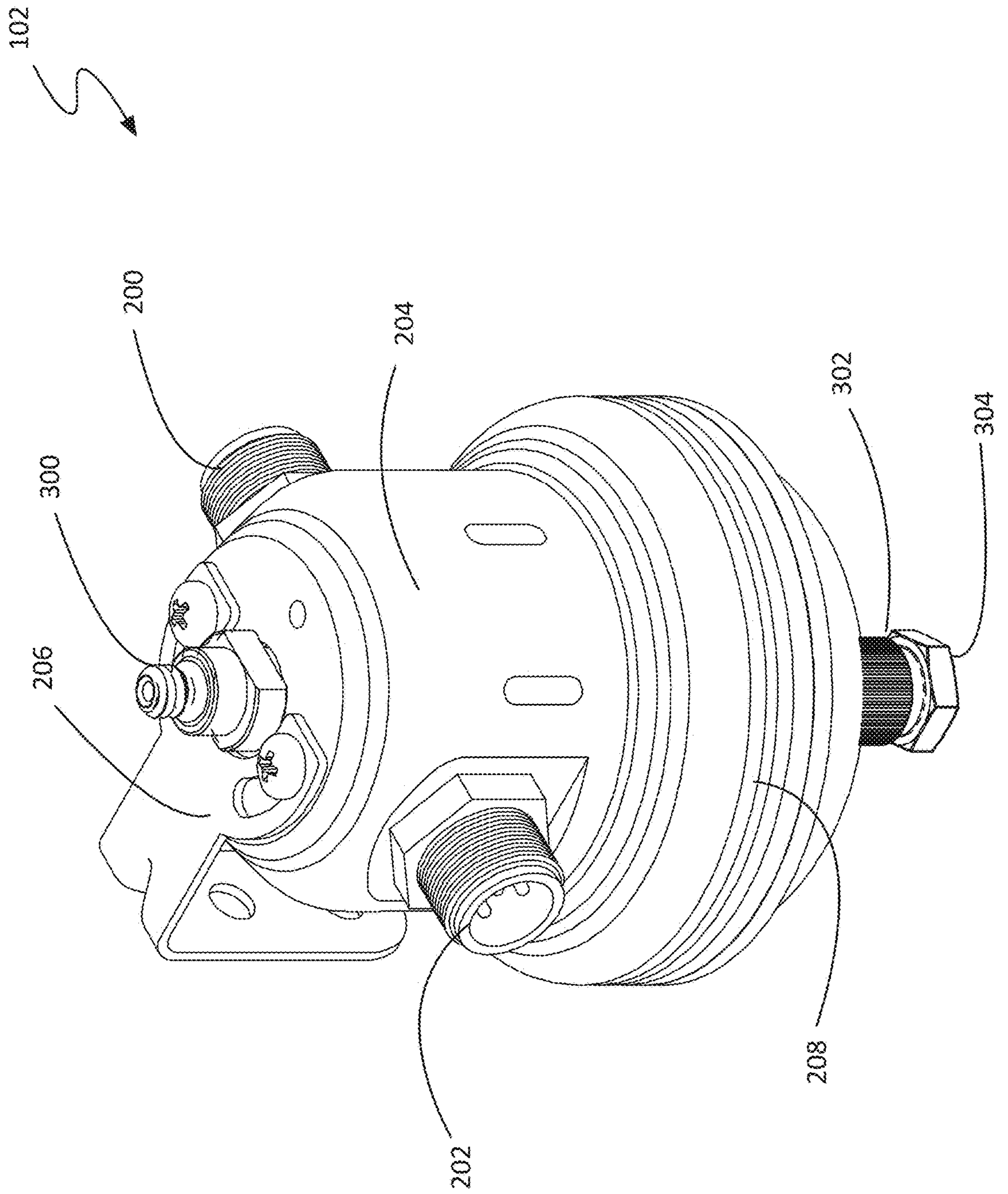
FIGS. 3A-3C are perspective, exploded, and side views, respectively, of a lighting unit with misting system integration.
Figure 3B:
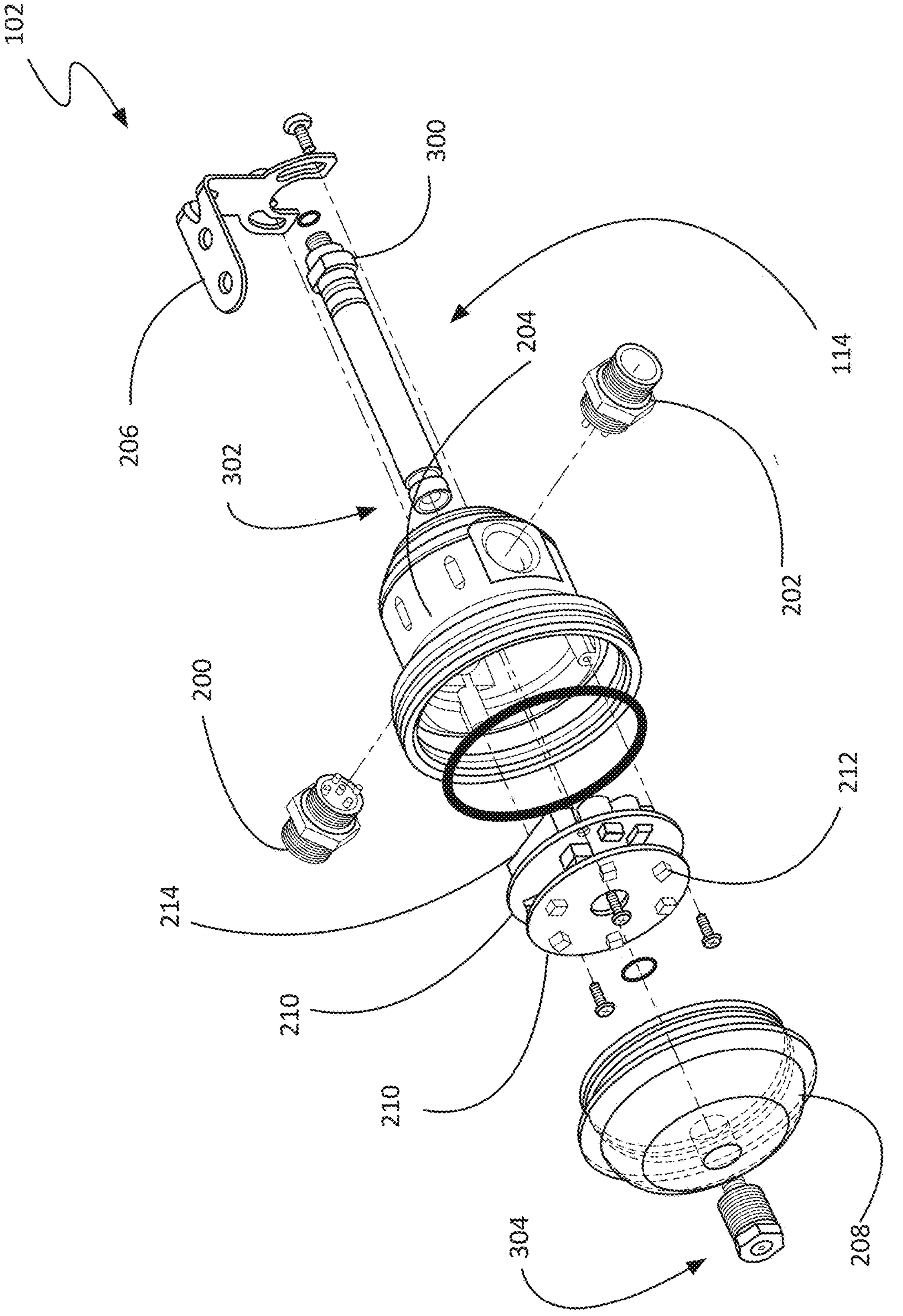

In some embodiments, first cable connector 200 and second cable connector 202 are connected to housing 204 from the outside, as shown, for example in FIGS. 2B, 2F, and 3B. A threaded portion of cable connectors 200, 202 may be secured into housing 204 (see FIG. 2F), after which wires may be connected from cable connectors 200, 202 to wires of PCB 210.

Other methods of assembling lighting units 102 may also be used. In some embodiments, first cable connector 200 and second cable connector 202 are connected to PCB 210 before being assembled to housing 204, as shown, for example, in FIGS. 19A-19C. For example, wires 201 of first cable connector 200 and second cable connector 202 may be soldered directly to PCB 210 (or connected in some other way). After wires 201 of first cable connector 200 and second cable connector 202 are connected to PCB 210, first cable connector 200 and second cable connector 202 may be passed through the inside of housing 204 and through respective openings 203 (one for each cable connector) so that they are secured to housing 204, with portions of the cable connectors 200, 202 protruding from the housing 204 so that they can connect with cables. In some embodiments, cable connectors 200, 202 are secured to housing 204 by having a portion 205 of cable connectors 200, 202 that is larger than the respective openings 203 (so that cable connectors 200, 202 cannot pass all the way through openings 203) and using a nut 207 to couple with threads of cable connectors 200, 202 on an exterior of housing 204, which may allow the cable connectors 200, 202 to be tightened into place.

As shown, the lighting unit 102 may also comprise other components, such as various O-rings used to weather-proof the connections of various components. These O-rings may be composed of a synthetic rubber like Ethylene Propylene Diene Monomer (EPDM), silicone rubber, or any other elastomeric material known in the art for use in O-rings and gaskets. Other components of the lighting unit 102, which will be discussed in greater detail with respect to FIG. 4, include a power converter and a communication interface.

Figure 3C:
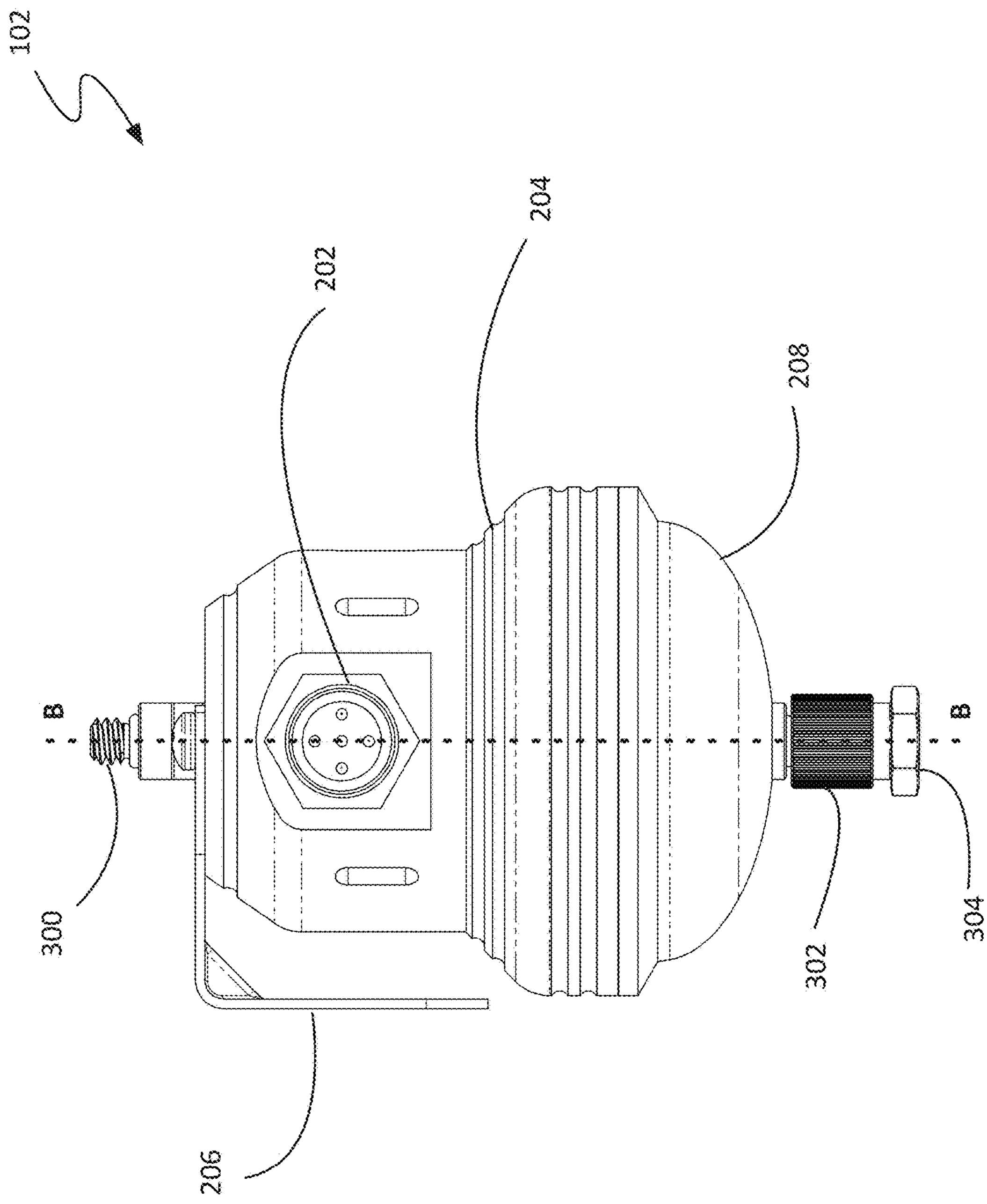
Figure 3D:
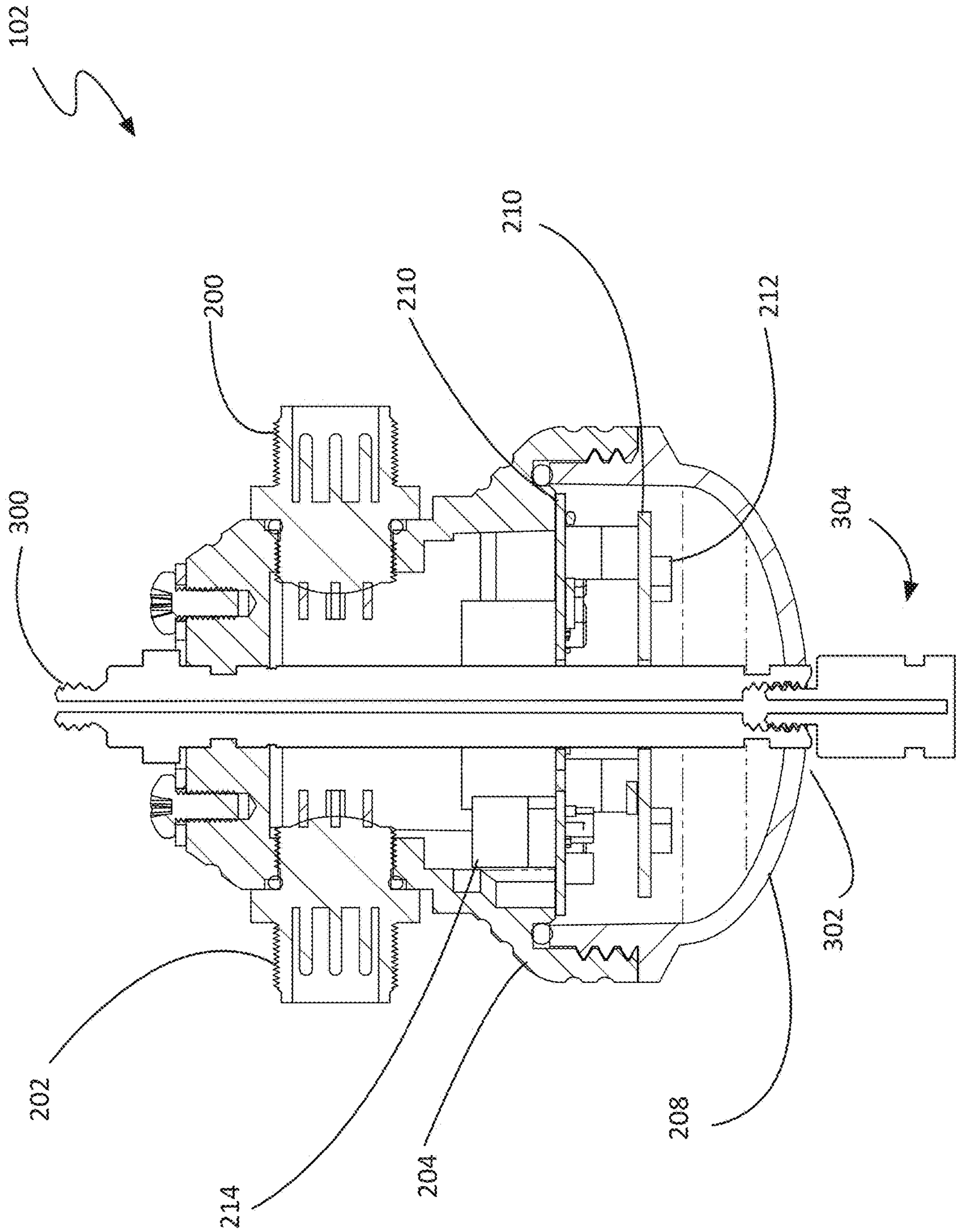
FIG. 3D is a cross-sectional view of the lighting unit of FIG. 3C, along line B-B.
Figure 3E:
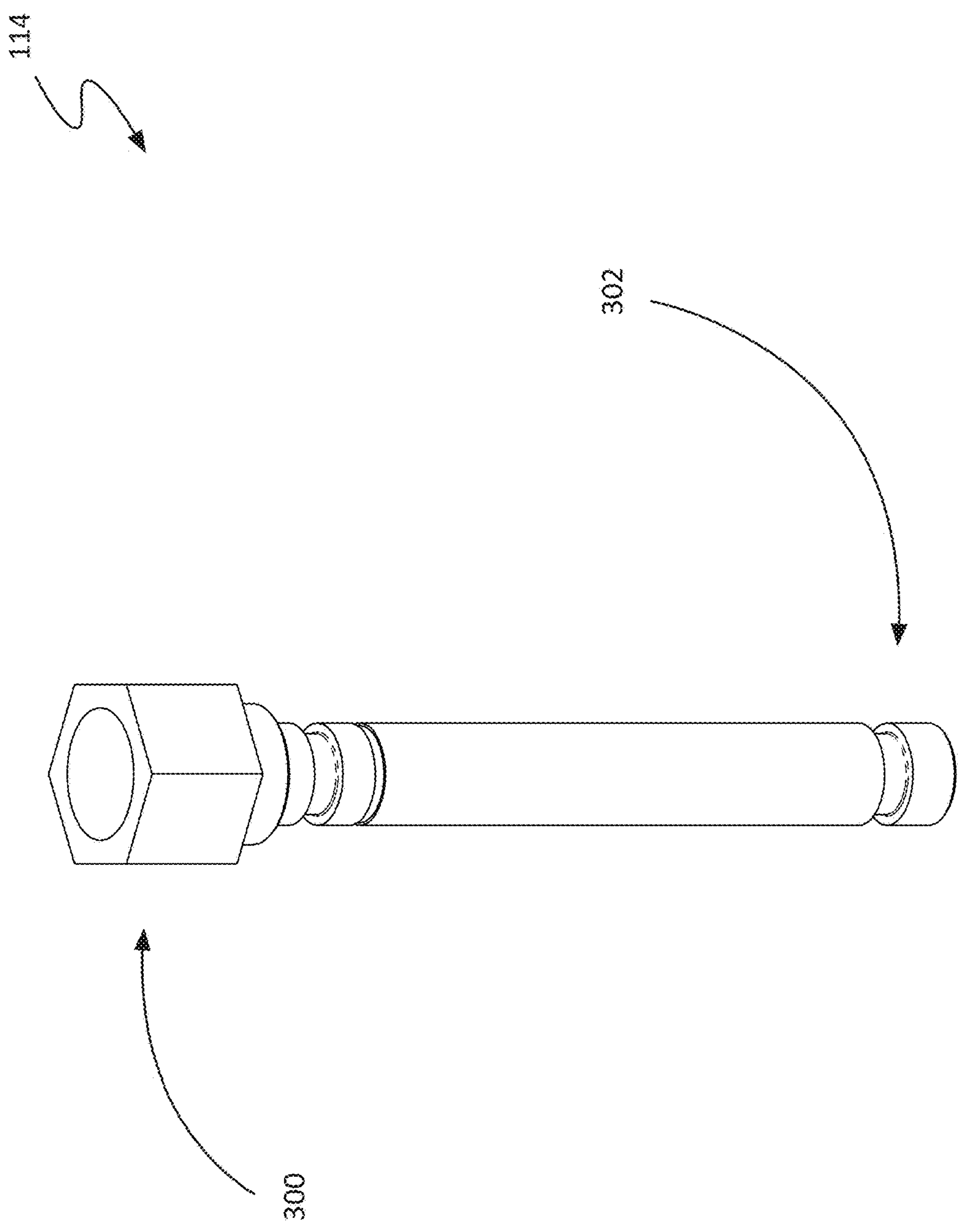
FIG. 3E is a perspective view of a misting stem.

FIGS. 3A-3D are various views of a non-limiting example of a lighting unit 102 configured to integrate with a misting system. Specifically, FIG. 3A is a perspective view, FIG. 3B is an exploded perspective view, and FIG. 3C is a side view. FIG. 3D is a cross-sectional view of the lighting unit 102 of FIG. 3C, taken along line B-B. FIG. 3E is a perspective view of another embodiment of a misting stem 114.

As shown, the lighting unit 102 that is configured to integrate with a misting system comprises a misting stem 114. In the context of the present description, a misting stem 114 is essentially a conduit for water, carrying it from a misting water supply on one side of the lighting unit 102 to a misting nozzle 304 on the other side. Specifically, the misting stem 114 comprises an input end 300 and an output end 302 distal to the input end 300. The misting stem 114 may be composed of stainless steel, or any other material known in the art of misting systems.

The input end 300 is configured to couple with a misting water supply line 116, such that the output end 302 is in fluid communication with said water supply. In some embodiments, the input end 300 may be threaded, either internally or externally. In some embodiments, the input end 300 may be shaped to couple with any misting system known in the art. For example, in some embodiments, the input end 300 may resemble a standard misting nozzle 304 or other structure that couples with the supply line 116 of a conventional misting solution. FIGS. 3A-3D show an input end 300 that has external threading. FIG. 3E shows another embodiment of a misting stem 114 whose input end 300 is configured to internally receive an interface with the misting system.

The output end 302 is shaped to couple with a conventional misting nozzle 304, shaped to emit the supplied water as a mist 112. In some embodiments, the output end may releasably couple with a nozzle 304, allowing for it to be replaced or removed for clearing scale or a clog, without having to completely disconnect the lighting unit 102. In other embodiments, the nozzle 304 may be permanently affixed to the misting stem 114.

According to various embodiments, the only difference between a lighting unit 102, such as the non-limiting example shown in FIG. 2A, and a lighting unit 102 configured to integrate with a misting system, such as the non-limiting example shown in FIG. 3A, is that the misting lighting unit 102 comprises a misting stem 114 that passes through the housing 204, the one or more PCBs 210, and the light cover 208. Advantageously, this may allow the same PCB 210 to be used in both misting and non-misting lighting units 102, allowing these units to operate identically.

Figure 4:
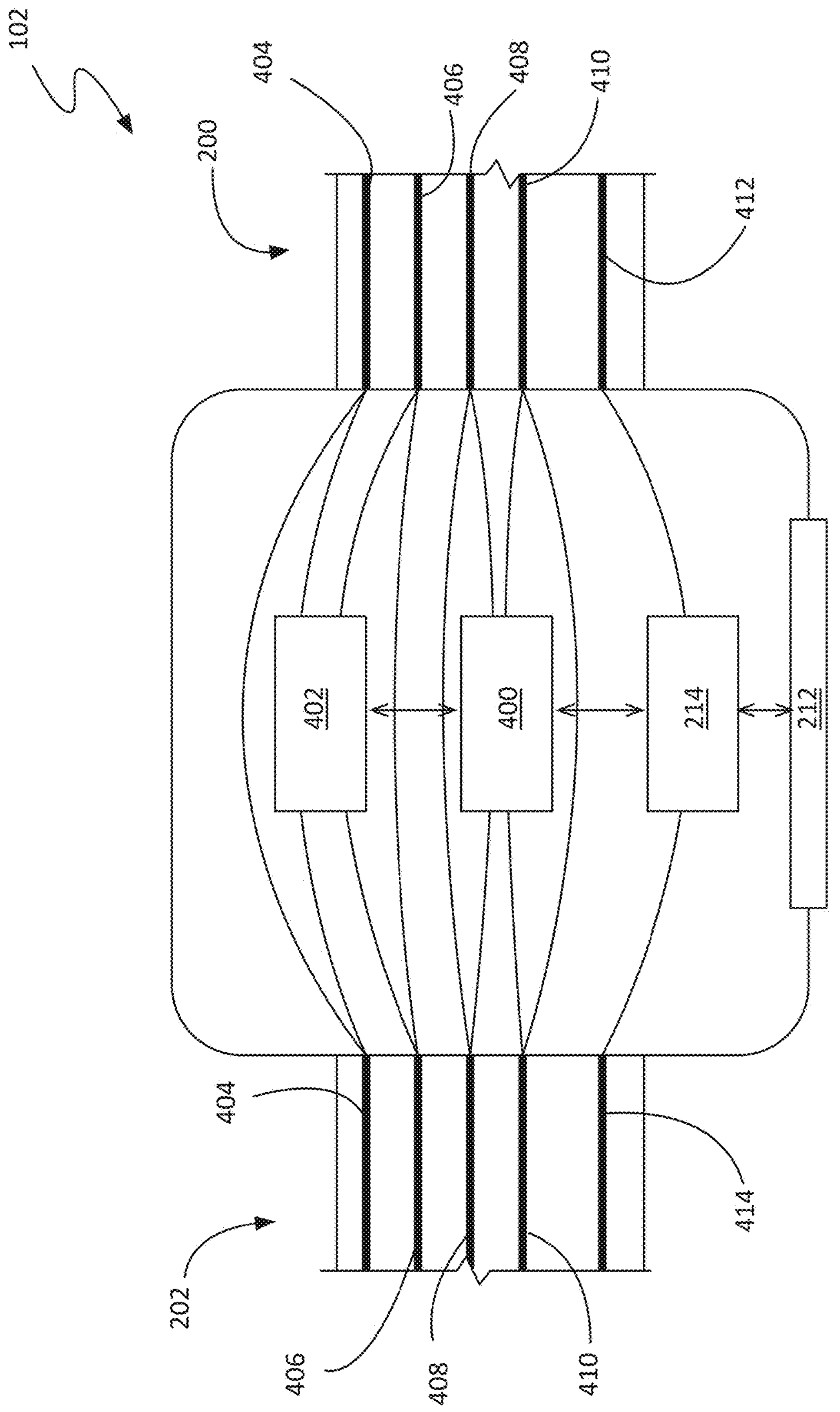
FIG. 4 is a schematic view of a lighting unit.

FIG. 4 is a schematic view of a non-limiting example of a lighting unit 102. Specifically, FIG. 4 shows the internal wiring of an exemplary lighting unit 102. As shown, in addition to a microcontroller 214, each lighting unit 102 further comprises a communication interface 400 and a power converter 402, according to various embodiments. The communication interface 400 and the power converter 402 are both communicatively coupled to the microcontroller 214.

In the context of the present description and the claims that follow, a communication interface 400 is a device responsible for sending and receiving messages from the control box 104 and to/from other lighting units 102. In some embodiments, the communication interface 400 may be an isolated integrated circuit or separate microcontroller, while in other embodiments it may be a module on the microcontroller 214.

According to various embodiments, the communication interface 400 may send and receive information in the form of packets, and may employ a variety of communication methods. For example, in some embodiments, the control box 104 and the lighting units 102 may communicate using serial communications based on the RS485 standard. According to various embodiments, each of the lighting units 102 has a unique address to which packets may be addressed. In some embodiments, a packet may be labeled as universal. The method for assigning addresses will be discussed in greater detail with respect to FIG. 7, below.

In the context of the present description and the claims that follow, a power converter 402 is a device that can receive the power provided by the control box 104 and place it in a condition to power the plurality of LEDs 212, which may comprise a modification of the current and/or voltage of the incoming electricity. In some embodiments, the power converter 402 may be a buck power supply, which steps down the voltage while increasing the current of the incoming electricity. Those skilled in the art will recognize other power conversions that may be necessary, depending on the LEDs 212 used, and the nature of the power provided by the control box 104.

Each lighting unit 102 comprises a first cable connector 200 and a second cable connector 202, and is connected to other units 102 or the control box 104 through cables 108. As will be discussed in greater detail with respect to FIG. 5, according to various embodiments, the cables 108 may each have five wires. Three of these wires are for communication, and two are for power. When the cables 108 are releasably coupled to the cable connectors, those five wires are communicatively coupled to five terminals. In some embodiments, as will be discussed in greater detail with respect to FIGS. 16-18, the cables may each have six wires.

As shown, each of the cable connectors comprises a first power terminal 404, a second power terminal 406, a first control terminal 408, and a second control terminal 410. Furthermore, the first cable connector 200 further comprises an address output terminal 412, and the second cable connector 202 further comprises an address input terminal 414.

As shown, the communication interface 400 is communicatively coupled with the first control terminal 408 and second control terminal 410 of both the first cable connector 200 and the second cable connector 202. Similarly, the power converter 402 is communicatively coupled with the first power terminal 404 and second power terminal 406 of both the first cable connector 200 and the second cable connector 202. According to various embodiments, like terminals of both cable connectors are also directly coupled to each other, with the exception of the address terminals. Specifically, the first power terminal 404 of the first cable connector 200 is communicatively coupled to the first power terminal 404 of the second cable connector 202, and so forth, with the other power and control terminals. In this way, other lighting units 102 are not reliant on an "upstream" lighting unit 102 to pass along power and/or packets. With respect to the communication interface 400, it should be noted that in other embodiments, other methods and protocols may be employed, such as each lighting unit 102 handing off each packet it receives.

Unlike the power and control terminals, the address input terminal 412 and address output terminal 414 of a lighting unit 102 are not directly coupled to each other, but rather are both coupled to the microcontroller 214. This plays an important part in the method for assigning addresses to the lighting units 102 without knowing their order at startup.

This allows the system 100 to have lighting units 102 that are both individually addressable and interchangeable.

It should be noted that while the previous discussion was done in the context of cables 108 having five wires, and the cable connectors having five terminals, in other embodiments, the cables 108 may have four wires, and the cable connectors may have four terminals. In these embodiments, the method for assigning addresses to the lighting units 102 would be adapted to rely entirely on the packet based communication, rather than on the combination of packet based communication and the detection of a state change, as will be discussed with respect to FIG. 7, below. In some embodiments, the cables 108 may have more than five wires. For example, as discussed below with respect to FIGS. 16-18, the cables may each have six wires.

Figure 5:
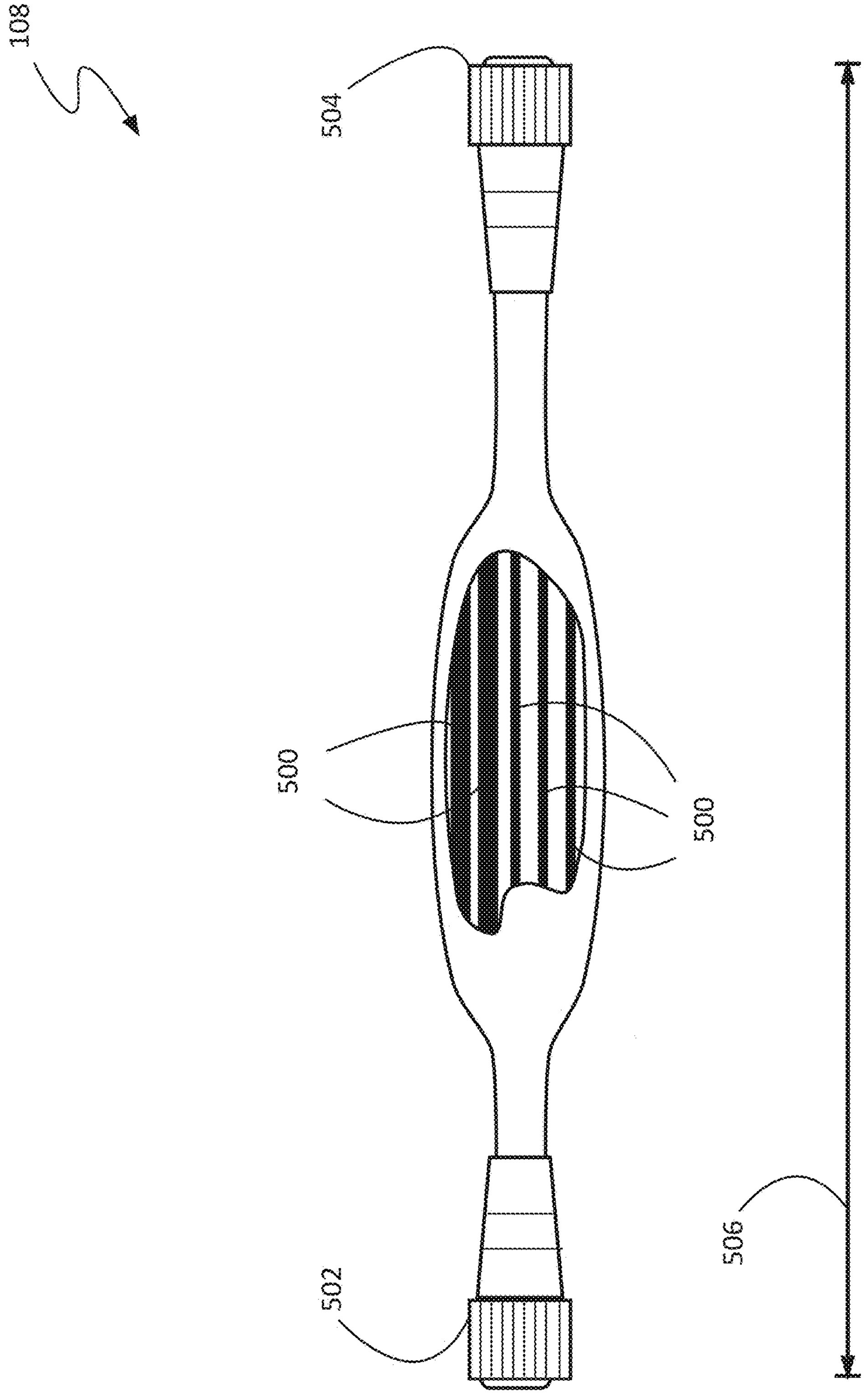
FIG. 5 is a side view of a cable.

FIG. 5 is a side view of a non-limiting example of a cable 108. For illustrative purposes, the middle of the cable 108 has been enlarged, and the outer shielding has been removed to expose the internal wires 500. This is for illustrative purposes only, and is not meant to be a limitation on the size or shape of a cable segment 108.

One of the advantages the system 100 contemplated herein has over conventional outdoor lighting solutions is that its modularity allows for it to be adapted to a variety of applications. The lighting units 102 are not forced to be spaced equidistant from each other, but rather are each releasably coupled to a cable 108 that may have whatever length is most appropriate for that portion of the system 100.

As shown, each cable 108 comprises a first end 502 and a second end 504. According to various embodiments, the ends of the cable 108 comprise couplings that allow the cables 108 to easily and reliably couple lighting units 102 to each other and to the control box 104. Because the system 100 is intended for outdoor use, the cables 108 comprise connectors at both ends that are weather resistant. For example, in some embodiments, the cables 108 have 5 pin, circular M12 connectors at each end that threadedly couple to the first/second cable connectors of the lighting units 102 and control box 104. As an option, the M12 may have a locking thread to better secure the cable 108 to the connector. These connectors may be IP 68 rated, and suitable for outdoor use.

Each cable 108 comprises a plurality of wires 500. In some embodiments, the cable 108 may have five wires 500, while in others the cable may have four or six wires 500. When the cable 108 has been coupled to a first cable connector 200 and a second cable connector 202, each of the wires 500 inside the cable 108 is communicatively coupled to like terminals in the two connectors, with the address output terminal 412 of the first cable connector 200 being communicatively coupled to the address input terminal 414 of the second cable connector 202.

As will be discussed with respect to FIG. 7, the system 100 assigns addresses to each lighting unit 102 to make them individually addressable in whatever order they are coupled in. In some embodiments, each lighting unit 102 is installed in a predictable orientation. Specifically, the second cable connector 202 of a lighting unit 102 is the connector where messages from the control box 104 would first be received, and the first cable connector 200 is coupled to a lighting unit 102 considered to be "downstream". According to various embodiments, the coupling of lighting units 102 in the proper direction is ensured by employing cables 108 having a first end 502 that is different than the second end 504, and cable connectors formed to mate with the cable ends. This means that a first end 502 will fit into a first cable connector 200, but not a second cable connector 202, and vice versa for the second end 504. As an option, in some embodiments, the lighting units 102, the connectors, and/or the cables 108 may have additional visual indications of which end is which, to facilitate installation. In some embodiments, as discussed further below with respect to FIGS. 20A and 20B, each lighting unit 102 may be installed in either direction (i.e., with either first cable connector 200 or second cable connector 202 connected to a downstream lighting unit 102). As a result, in some embodiments, the cables 108 may have a first end 502 that is the same as a second end 504. This may speed up installation because an installer does not need to check whether a cable 108 or a lighting unit 102 is oriented in a certain way.

The advantage of using modular lighting units 102 that are releasably coupled to each other with cables 108 is that various cable lengths 506 may be used. Cables 108 may be provided in a variety of lengths 506, allowing an installer to choose the best length for the desired separation between two lighting units 102. Since the cables 108 are releasably coupled to the lighting units 102, if the system 100 is rearranged, different cables may be used to relocate the lighting units 102 to have a different separation. The lengths may range from a few inches, to a foot, to multiple feet, and even longer, according to some embodiments. Those skilled in the art will recognize that a variety of lengths may be employed by the system 100.

As shown, in some embodiments, the wires 500 within the cable 108 are not identical. For example, in some embodiments, the power wires may be thicker (have a smaller gauge) than the wires used for communication and signaling. As an option, the pair of wires that couple to the control terminals may be a shielded, twisted pair, as is known in the art for serial communication. As a specific example, in one embodiment, the two power wires may be 18 gauge, while the communication and addressing wires may be 24 gauge. Using 18-gauge power wires facilitates providing more power, which in turn may allow a string of lights to function properly over a certain distance without any problems, such as unwanted dimming, at a far end of the string of lights due to a lack of power. For example, in some embodiments, 18-gauge power wires may run a string of up to 80 lights spanning a distance of 350 feet without any dimming or other problems at the end of the string of lights. Those skilled in the art will recognize that the thickness and shielding of the wires may be modified to meet the needs of various embodiments.

As noted above, in some embodiments, six wires may be used instead of five. For example, in some embodiments cable connectors (e.g., on the control box 104, on a lighting unit 102) include six terminals, as shown, for example, in FIG. 13. The cable connectors shown in FIGS. 12-15 may be used for any embodiments of the lighting units and control boxes disclosed herein. For example, first cable connector 200 of control box 104 may be arranged like cable connector 1200 shown in FIGS. 12-14. Similarly, first cable connector 200 and/or second cable connector 202 of lighting unit 102 may be arranged like cable connector 1250 shown in FIG. 15.

FIG. 12 shows a perspective view of cable connector 1200, and the wires associated with cable connector 1200, for a control box (e.g. control box 104) according to some embodiments. The wires shown in FIG. 12 would be disposed internally within the control box when cable connector 1200 is implemented on a control box. These wires include wires 1202, 1204, 1206, 1208, 1210, and 1212. In some embodiments, wires 1202, 1204, 1206, 1208, 1210, and 1212 may be between 200 and 400 mm long. For example, each of wires 1202, 1204, 1206, 1208, 1210, and 1212 may be 300 mm long.

In some embodiments, wires 1202, 1204, 1206, 1208, 1210, and 1212 may include an internal conductor 1214 and an outer insulator 1216. The internal conductor 1214 may comprise any conductive metal and the insulator 1216 may comprise any insulating material. For example, the insulator 1216 may comprise silicon. In some embodiments, the ends of wires 1202, 1204, 1206, 1208, 1210, and 1212 are stripped and tinned, such that the conductors 1214 extend beyond the insulators 1216, to provide a conductive end that can electrically connect to an internal component of a control box. The stripped and tinned end may be up to 10 mm long (e.g., 2, 4, 6, 8, or 10 mm). In some embodiments, the stripped and tinned end may be longer than 10 mm. The other end of wires 1202, 1204, 1206, 1208, 1210, and 1212 are electrically connected to one of the six terminals of cable connector 1200.

In some embodiments, wires 1202, 1204, 1206, 1208, 1210, and 1212 each connect to a processor, a microcontroller, a power supply, or a network interface of the control box. For example, some of wires 1202, 1204, 1206, 1208, 1210, and 1212 connect to a power supply to convey power to certain terminals, while some of wires 1202, 1204, 1206, 1208, 1210, and 1212 connect to a processor, microcontroller, or network interface to convey communication signals to other terminals. In some embodiments, two of the wires (e.g., wires 1202, 1204) are configured to convey power to two of the six terminals. One of these (e.g., wire 1202) may be a neutral wire. The power wires may be thicker than the other wires and may, for example, be 18 gauge. As discussed above, using thicker wires facilitates providing more power, which in turn may allow a string of lights to function properly over a certain distance without any problems, such as unwanted dimming, at a far end of the string of lights due to a lack of power.

In some embodiments, four of the wires, (e.g., wires 1206, 1208, 1210, and 1212) are configured to convey communication signals to four of the six terminals. The communication wires may be thinner than the power wires and may, for example, be 22 gauge. In some embodiments, two of the communication wires (e.g., wires 1206, 1208) are twisted together to form a twisted pair.

In some embodiments, the body of cable connector 1200 may be made of a metal or a hard plastic. For example, the body of cable connector 1200 may be made of aluminum or a similar material. In some embodiments, cable connector 1200 may be threaded to releasably connect with a cable (such as cable 1300 in FIG. 16). The threading may be internal threading or external threading. In some embodiments, the threading is offset from a base of cable connector 1200, which may improve sealing between a cable and cable connector 1200. In some embodiments, cable connector 1200 may include an O-ring 1218 to help with sealing (see FIG. 14). For example, the O-ring may be positioned at the same location where the threading is offset (e.g., adjacent to a base of the cable connector 1200), as shown in FIG. 14.

Cable connector 1200 may include six terminals, as shown, for example, in FIG. 13. In some embodiments, the terminals comprise pins (e.g., pins 1201, 1203, 1205, 1207, 1209, and 1211). Each pin may be electrically connected to one of the wires discussed above. For example, pin 1201 may be electrically connected to wire 1202, pin 1203 may be electrically connected to wire 1204, pin 1205 may be electrically connected to wire 1206, pin 1207 may be electrically connected to wire 1208, pin 1209 may be electrically connected to wire 1210, and pin 1211 may be electrically connected to wire 1212.

In some embodiments, a subset of pins 1201, 1203, 1205, 1207, 1209, and 1211 is configured to convey power and a subset of pins 1201, 1203, 1205, 1207, 1209, and 1211 is configured to convey communication signals. For example, in some embodiments, two pins (e.g., pin 1201 and pin 1203) are configured to convey power and four pins (e.g., pins 1205, 1207, 1209, 1211) are configured to convey communication signals. Different numbers of pins may be configured to convey power and communication signals in other embodiments. For example, in some embodiments, only three of the pins (e.g., pins 1205, 1207, and 1209) are configured to convey communication signals and pin 1211 operates as a ground.

In some embodiments, the pins (e.g., pins 1201, 1203) configured to convey power are thicker than the other pins and may have a thickness of, for example, 1.5 millimeters and an amp rating of, for example, 7.5 amps. In some embodiments, the pins (e.g., pins 1205, 1207, 1209, 1211) configured to convey communication signals are thinner than the other pins and may have a thickness of, for example, 1 millimeter and an amp rating of, for example, 4 amps.

In some embodiments, one of pins 1201, 1203, 1205, 1207, 1209, and 1211 is longer than every other pin. For example, pins 1203, 1205, 1207, 1209, and 1211 may be the same length, and pin 1201 may be longer than these other pins, as shown in FIG. 14, which is a cross-sectional view of cable connector 1200 in FIG. 13 taken along line C-C. In some embodiments, pin 1201 is 2 millimeters longer than pins 1203, 1205, 1207, 1209, and 1211. The longer pin (e.g., pin 1201) may be a pin that is configured to convey power. In some embodiments, the longer pin (e.g., pin 1201) is neutral. Because pin 1201 is longer than the other pins, a cable (such as cable 1300) connects to pin 1201 before connecting to the other pins. This configuration ensures that any component (cable or lighting unit) being connected to power is first connected to neutral, which may reduce the likelihood of damaging the parts of the system as a component is being plugged in.

In some embodiments, pins 1201, 1203, 1205, 1207, 1209, and 1211 are arranged symmetrically in cable connector 1200 (see FIG. 13). For example, pins 1201, 1203, 1205, 1207, 1209, and 1211 may be positioned in a circular arrangement around a center of cable connector 1200. In some embodiments, pins configured to convey power (e.g., pins 1201, 1203) are positioned along a horizontal axis of cable connector 1200. In some embodiments, pins configured to convey communication signals (e.g., pins 1205, 1207, 1209, 1211) are positioned symmetrically around the horizontal axis and a vertical axis of cable connector 1200. There may be two pins configured to convey communication signals (e.g., pins 1205, 1211) disposed above the pins configured to convey power (e.g., pins 1201, 1203). There may be two pins configured to convey communication signals (e.g., pins 1207, 1209) disposed below the pins configured to convey power (e.g., pins 1201, 1203).

In some embodiments, cable connector 1200 includes a key 1220 to ensure that a cable (such as cable 1300) is oriented correctly to connect with cable connector 1200. Key 1220 may be a projection or a groove configured to mate with a corresponding part on a cable end.

FIG. 15 shows a perspective view of cable connector 1250, and the wires associated with cable connector 1250, for a lighting unit (e.g., lighting unit 102) according to some embodiments. The wires shown in FIG. 15 would be disposed internally within the lighting unit when cable connector 1250 is implemented on a lighting unit. For example, wires 201 in FIGS. 19A and 19B may represent the wires shown in FIG. 15. These wires include wires 1252, 1254, 1256, 1258, 1260, and 1262. In some embodiments, wires 1252, 1254, 1256, 1258, 1260, and 1262 may be between 50 and 150 mm long. For example, each of wires 1252, 1254, 1256, 1258, 1260, and 1262 may be 85 mm long.

Cable connector 1250 may have the same features as cable connector 1200, as disclosed above. For example, the disclosure with respect to wires 1202, 1204, 1206, 1208, 1210, and 1212 applies to wires 1252, 1254, 1256, 1258, 1260, and 1262, respectively. And cable connector 1250 may have pins 1201, 1203, 1205, 1207, 1209, and 1211 as disclosed above (see FIGS. 13-14). In some embodiments, the only difference between cable connector 1200 and cable connector 1250 is the length of the wires (e.g., wires 1202, 1204, 1206, 1208, 1210, and 1212 may be longer than wires 1252, 1254, 1256, 1258, 1260, and 1262).

Cables of various lengths may connect to cable connector 1200 and cable connector 1250 to connect a lighting unit to a control box. Those cable may also connect to two cable connectors 1250 to connect two lighting units. Thus, a string of lights in various arrangements may be assembled depending on the location where the lighting system is being installed. Cable 1300, as shown, for example, in FIG. 16, illustrates a configuration for these cables. The break in the middle section of cable 1300 represents that the cable 1300 may be provided in a variety of lengths (e.g., some long cables and some short cables), as discussed for cable 108 above. The cable shown in FIGS. 16-18 may be used for any embodiments of the lighting units and control boxes disclosed herein. For example, cable 108 may be arranged like cable 1300 shown in FIGS. 16-18.

Cable 1300 comprises two ends 1320. As shown in FIG. 16, the ends 1320 of cable 1300 may comprise couplings that allow cable 1300 to easily and reliably couple lighting units to each other and to the control box (e.g., by connecting to cable connectors 1200, 1250). In some embodiments, ends 1320 may be threaded to releasably connect with a cable connector (such as cable connector 1200 and cable connector 1250). The threading may be internal threading or external threading.

In some embodiments, as shown, for example, in FIG. 17, ends 1320 each comprise a set of sockets 1301, 1303, 1305, 1307, 1309, and 1311. The sockets 1301, 1303, 1305, 1307, 1309, and 1311 are configured to interface with pins 1201, 1203, 1205, 1207, 1209, and 1211 of cable connector 1200 and of cable connector 1250. For example, socket 1301 may be configured to receive pin 1201, socket 1303 may be configured to receive pin 1203, socket 1305 may be configured to receive pin 1205, socket 1307 may be configured to receive pin 1207, socket 1309 may be configured to receive pin 1209, and socket 1311 may be configured to receive pin 1211. In some embodiments, sockets 1301 and 1303 have a larger width than the other sockets so that they can receive the thicker pins 1201 and 1203. In some embodiments, ends 1320 comprise a key 1324 to ensure that a cable (such as cable 1300) is oriented correctly to connect with cable connector 1200 and cable connector 1250. Key 1324 may be a projection or a groove configured to mate with key 1220 on cable connector 1200 and cable connector 1250. In embodiments where the cable is configured to be connected with a certain end upstream and the other end downstream, key 1324 on each end 1320 may be different from each other. Corresponding keys 1220 may be different for certain cable connectors 1200, 1250 to ensure the correct parts are being connected. In embodiments where either end may be connected upstream or downstream, key 1324 on each end 1320 may be the same as each other and keys 1220 are the same for cable connector 1200 and cable connector 1250. This approach may simplify and/or expedite the assembly or rearranging of the lighting system because the order of the lighting units and orientations of the lighting units (i.e., which cable connector of a lighting unit is upstream vs. downstream) and cables does not matter.

In some embodiments, cable 1300 comprises an outer shield 1322 that extends between the coupling at each end 1320 (see FIG. 16) and encloses a plurality of wires. The outer shield 1322 may be weather resistant (e.g., resistant to sun, water resistant, etc.). In some embodiments, cable 1300 comprises six wires. The plurality of wires connects sockets 1301, 1303, 1305, 1307, 1309, and 1311 at one end 1320 with sockets 1301, 1303, 1305, 1307, 1309 and 1311 at the other end 1320.

The plurality of wires may include wires 1302, 1304, 1306, 1308, 1310, and 1312, as shown, for example, in FIG. 18. In some embodiments, wires 1302, 1304, 1306, 1308, 1310, and 1312 may include internal conductor 1214 and outer insulator 1216 (similar to wires 1202, 1204, 1206, 1208, 1210, 1202). In some embodiments, one of wires 1302, 1304, 1306, 1308, 1310, and 1312 is not insulated. For example, in some embodiments, wire 1312 does not include an outer insulator 1216 and is not insulated. Wire 1312 may operate as a ground, as discussed further below.

In some embodiments, the ends of wires 1302, 1304, 1306, 1308, 1310, and 1312 are stripped and tinned on each end, such that the conductors 1214 extend beyond the insulators 1216, to provide a conductive end that can electrically connect to sockets 1301, 1303, 1305, 1307, 1309, and 1311. Thus, the plurality of wires 1302, 1304, 1306, 1308, 1310, and 1312 connect a first set of sockets 1301, 1303 1305, 1307, 1309, and 1311 at one end 1320 of cable 1300 to a second set of sockets 1301, 1303 1305, 1307, 1309, and 1311 at the other end 1320 of cable 1300. The stripped and tinned ends may be up to 10 mm long (e.g., 2, 4, 6, 8, or 10 mm). In some embodiments, the stripped and tinned ends may be longer than 10 mm.

In some embodiments, some of wires 1302, 1304, 1306, 1308, 1310, and 1312 are configured to convey power, while some of wires 1302, 1304, 1306, 1308, 1310, and 1312 are configured to convey communication signals. In some embodiments, two of the wires (e.g., wires 1302, 1304) are configured to convey power from sockets (e.g., sockets 1301, 1303) on one end 1320 to sockets (e.g., sockets 1301, 1303) on the other end 1320. One of these (e.g., wire 1302) may be a neutral wire. The power wires may be thicker than the other wires and may, for example, be 18 gauge.

In some embodiments, four of the wires, (e.g., wires 1306, 1308, 1310, and 1312) are configured to convey communication signals from sockets (e.g., sockets 1305, 1307, 1309, 1311) on one end 1320 to sockets (e.g., sockets 1305, 1307, 1309, 1311) on the other end 1320. The communication wires may be thinner than the power wires and may, for example, be 22 gauge. In some embodiments, two of the communication wires (e.g., wires 1306, 1308) are twisted together to form a twisted pair. Different numbers of wires may be configured to convey power and communication signals in other embodiments. For example, in some embodiments, only three of the wires (e.g., wires 1306, 1308, and 1310) are configured to convey communication signals and wire 1312 operates as a ground.

In some embodiments, cable 1300 comprises a foil 1318 disposed within outer shield 1322. Foil 1318 may be wrapped around at least two wires of the plurality of wires

1302, 1304, 1306, 1308, 1310, and 1310. Thus, foil 1318 may be wrapped around a subset of wires (i.e., some but not all the wires). In some embodiments, foil 1318 is wrapped around five of the wires. For example, foil 1318 may be wrapped around wires 1302, 1304, 1306, 1308, and 1310, as shown in FIG. 18. FIG. 18 shows a portion of foil 1318 pulled away from being wrapped around wires 1302, 1304, 1306, 1308, and 1310, but this is just for purposes of seeing what is disposed within foil 1318. In some embodiments, one wire (e.g., wire 1312) is disposed exterior to foil 1318. As mentioned above, wire 1312 may not be insulated, thus leaving the conductive part of wire 1312 exposed. In some embodiments, wire 1312 is in contact with foil 1318. Thus, foil 1318 may be connected to ground (e.g., wire 1312). Wire 1312 and foil 1318 may help prevent interference (e.g., from cell phone towers, radio, power lines, or other sources of electrical interference) from disrupting the communication of or otherwise interfering with the electrical signals of lighting system 100.

Figure 6:
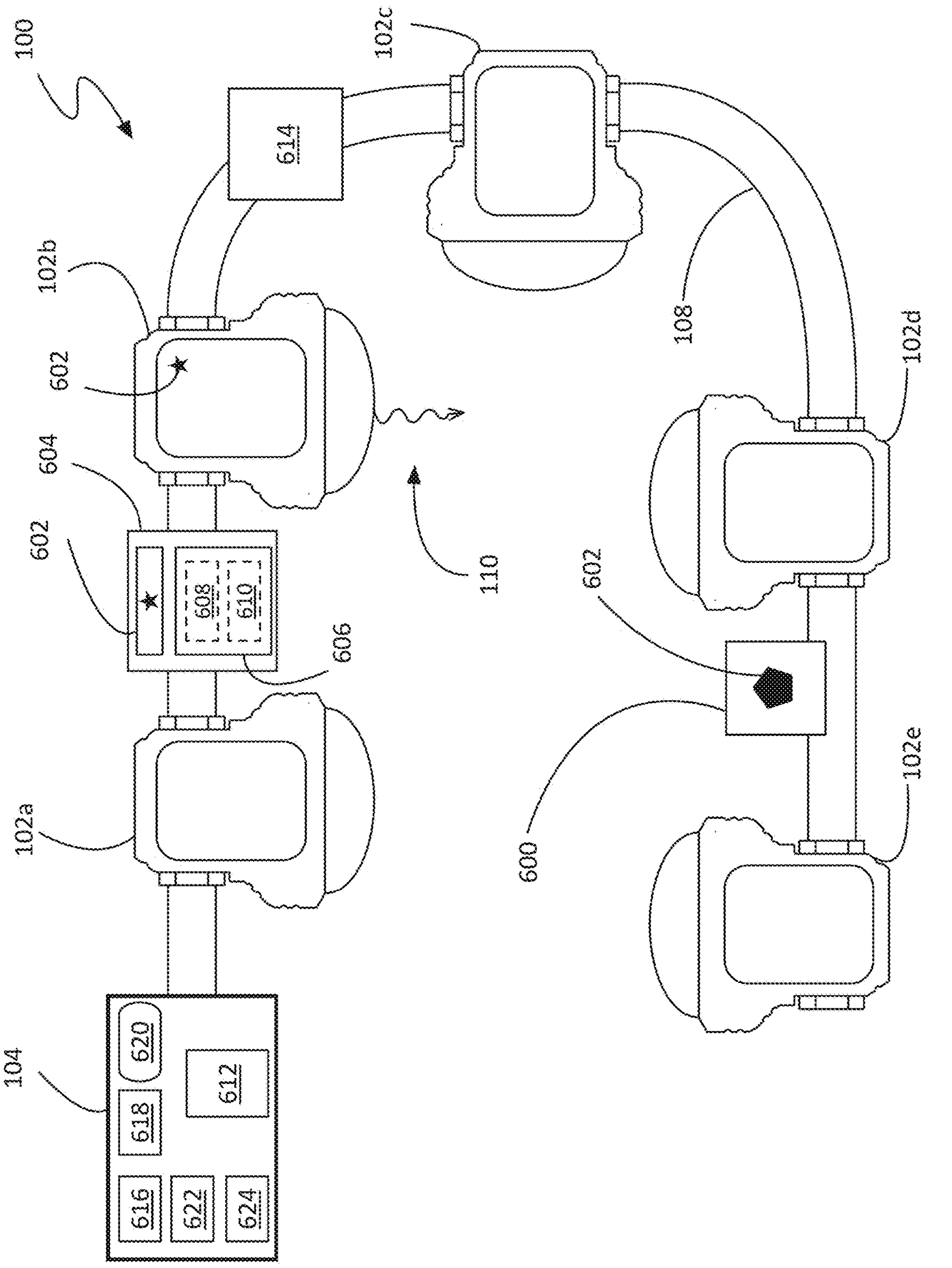
FIG. 6 is a network view of a modular lighting system.

FIG. 6 is a network view of a non-limiting example of a modular lighting system 100 comprising a control box 104 and a plurality of lighting units 102 coupled together by a plurality of cables 108. It should be noted that although the lighting units 102 shown in FIG. 6 are individually labeled (e.g. 102*a*, 102*b*, etc.), such labeling is only meant to indicate the current order of the lighting units 102, which may be temporary. The labeling is not meant to indicate any difference between the lighting units apart from their relative order. However, it should also be noted that such a system 100 could also be assembled with a heterogeneous collection of lighting units 102, as well. For the purposes of the following discussion, the different unit labels simply refer to their present order in the chain of lighting units coupled to the control box 104, with 102*a* being the first lighting unit, 102*b* being the second, and so forth.

According to various embodiments, a modular lighting system 100 is assembled by first releasably coupling the control box 104 to the plurality of lighting units 102 in a series using the cables 108. Each lighting unit 102 has a first and second cable connector, while the control box 104 only has a first cable connector 200. Once the lighting units 102 and control box 104 are all connected to each other, the system 100 may be initialized.

In some embodiments, the system 100 is initialized every time the power of the control box 104 is turned on. In other embodiments, system initialization may be triggered in response to some other event, or may be triggered manually. In the context of the present description and the claims that follow, initializing the system means, at the least, triggering the lighting units 102 to each adopt a unique address 602. According to various embodiments, addresses 602 are sent among the lighting units 102 via address packets 600, which comprise an address 602. Adopting unique addresses will be discussed in detail with respect to FIG. 7.

Another aspect of system initialization is that, as the lighting units 102 adopt addresses 602, the control box 104 assembles an ordered list of addresses 612, which is stored by the control box 104 for use in instructing specific units 102. Before initialization begins, in some embodiments, this ordered list 612 is erased, so the system 100 is set up fresh each time the power is turned on, or some other initialization stimulus is detected.

Once the system 100 has been initialized, the control box 104 may begin sending instructions to the various lighting units 102, using their unique addresses 602. In some embodiments, each lighting unit 102 may include a soft-start circuit to prevent a sudden current flow in lighting unit 102. The soft-start circuits may help protect lighting units 102 from damage. Each lighting unit 102 may be instructed to drive the LED's 210 in a particular way. Such an instruction may take the form of a light packet 604. According to various embodiments, a light packet 604 comprises an address 602 that has been adopted by one of the lighting units 102, and a color value 606. In the context of the present description and the claims that follow, a color value 606 is a data object that describes attributes of an instance of light 110 emitted by an LED 212 or collection of LEDs 212. The color value 606 may indicate a hue 608 (e.g. a point within a color space accessible to the LED driver of the microcontroller 214, etc.), a brightness 610 (e.g. scalar intensity, driving current, etc.), or both. Those skilled in the art will recognize that different microcontrollers 214 may be configured to receive LED driving instructions in different formats, and that a color value 606 may be represented in a number of different formats.

Upon receipt of a light packet 604 whose address 602 matches the unique address that has been adopted, the associated lighting unit 102 will drive the plurality of LEDs 212 to emit light 110 described by the color value 606 of the light packet 604. As will be discussed with respect to FIG. 8C, in some embodiments, lighting units 102 may take note of and store the color values 606 that are addressed to other lighting units 102, as well.

In some embodiments, the system 100 may be initialized automatically each time it is powered on. In many instances, the initialization process will be so fast, reinitializing the system each time it is powered on will not result in any noticeable delay for the user. In other embodiments, the initialization of the system 100 may be triggered when a reset packet 614 is sent out. In the context of the present description and the claims that follow, a reset packet 614 is a packet that triggers each lighting unit 102 to forget the previously adopted address, in preparation for the adoption of a new address. In some cases, forgetting the address comprises overwriting the address in the memory of the microcontroller 214, while in other embodiments, the forgetting of the address effectively occurs when the unit 102 is placed into an addressable state, which will be discussed with respect to FIG. 7. In some embodiments, a reset packet may have no address, with all units 102 reacting to it as it propagates through the chain of units. In other embodiments, a reset packet 614 may be addressed to each individual lighting unit 102.

As shown in FIG. 6, the control box 104 comprises a power supply 616 and a network interface 618, both communicatively coupled to a processor 622 and memory 624. Those skilled in the art will recognize that in some embodiments, the processor 622 and memory 624 may be replaced with a microcontroller 214, or another form of embedded system. Similar to the lighting units, the processor 622, power supply 616, and network interface 618 are also communicatively coupled to the terminals of the first cable connector 200 of the control box 104.

As previously mentioned, the power supply 616 of the control box 214 may be the limiting factor in how many lighting units 102 may be included in the system 100. As a specific example, in one embodiment, the power supply 616 may output 36 volts to the lighting units 102, and the cables 108 used are limited to 9A of current. In some embodiments, a system 100 may be expanded beyond such limits by joining two systems 100 together. For example, in one embodiment, one system 100 may be slaved to another system 100, such that they operate as a single system, but each receives power from its own control box 104.

The network interface 618 of the control box 104 may operate in the same way as the communication interface 400 of the individual lighting units 102, being adapted for communication between units 102 and the control box 104. In some embodiments, the network interface 618 of the control box 104 may have additional functionality including, but not limited to, Bluetooth and WIFI communications with other devices (e.g. mobile devices running a control application, remote servers, media streaming services, home automation systems, virtual assistants, etc.). In some embodiments, control box 104 may be configured to receive software updates over Bluetooth or WIFI connections. In some embodiments, control box 104 may be configured to communicate with other control boxes 104 over Bluetooth or WIFI connections. This may be used, for example to coordinate lighting across multiple lighting systems 100 with each lighting system 100 having a control box 104 and its own set of lighting units 102. Some embodiments may provide a network interface to the individual lighting units 102, providing great flexibility in how the system 100 may be controlled by the user.

In some embodiments, the control box 104 may also have an auxiliary power output 620. In the context of the present description and the claims that follow, an auxiliary power output 620 is a low voltage power output that can be controlled using the control box 104, or an interface (e.g. physical, remote, etc.) of the control box 104. This may be used to turn on/off a number of related devices, such as the pump for a misting system, a music system, and the like. In some embodiments, control unit 104 includes a relay configured to control power to the lighting units 102 or other components on the line. For example, when control unit 104 is powered off, the relay is configured to turn off and thus remove power to the rest of the line of cables and lighting units. Some embodiments also have an audio input, which will be discussed in greater detail with respect to FIGS. 9 and 10.

Figure 7:
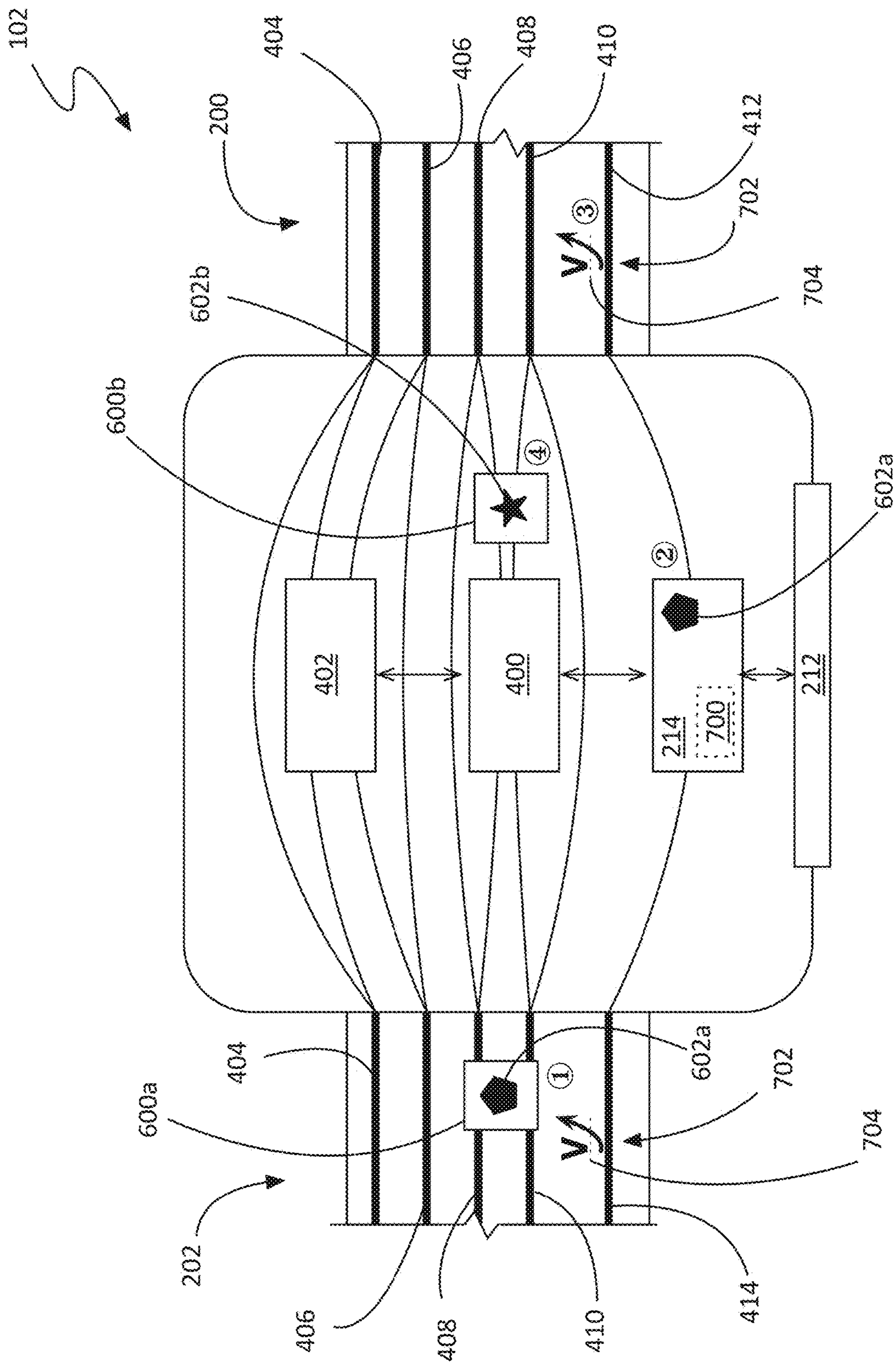
FIG. 7 is a process flow of a lighting unit adopting an address.

FIG. 7 is a non-limiting example of a process for a lighting unit 102 to adopt an address 602 in response to a system initialization. It should be noted that the lighting unit 102*a* shown in FIG. 7 is representative of the first lighting unit of the plurality 102, and is the first lighting unit 102*a* coupled to the control box 104, the process being described is followed by all of the lighting units 102.

First, the control box 104 or the lighting unit 102 immediately preceding the lighting unit being discussed places the lighting unit 102*a* in an addressable state 700. In the context of the present description and the claims that follow, an addressable state 700 is when the microcontroller 214 of a lighting unit 102 has been prepared to adopt the address 602 of the next address packet 600 received. Only one lighting unit 102 in the system 100 should be in the addressable state 700 at a time, to prevent duplicate addresses.

In some embodiments, a lighting unit 102 may be driven into an addressable state 700 through a signal or a change in state 702 detected at the address input terminal 414 of the second cable connector 202. For example, in some embodiments, the change in state 702 is the crossing of a voltage threshold 704, a predefined voltage wherein when the voltage on the address input terminal 414 crosses said threshold 704 (e.g. surpasses it, drops below it, etc.), the microcontroller 214 enters the addressable state 700. See circle '1'. As an option, being in the addressable state 700 may further require a lack of activity or state changing occurring on the address terminal of the first cable connector 200 (e.g. the addressable state 700 requires a change in state at the input and a lack of change of state at the output, etc.). In other embodiments, different changes in state or signals (e.g. a pulse, etc.) may be used. The monitoring of the address input terminal 414 is advantageous since, unlike the other terminals, it does not pass through. A change in state 702 at the address input terminal 414 is not simultaneously propagated on to the address output terminal 412, around the microcontroller 214, like the power and control terminals. Other embodiments may trigger the addressable state 700 through a change in state in a different terminal/wire.

After the lighting unit 102*a* has entered the addressable state 700 in response to detecting the change in state 702 at the address input terminal 414 of its second cable connector 202, it then waits for the next address packet 600 to come along, which will be referred to as the first address packet 600*a*, meaning the first address packet seen by the microcontroller 214 since entering the addressable state 700. Upon receipt of the first address packet 600*a*, the lighting unit 102*a* adopts the address 602*a*, which is unique among the lighting units 102 since the first lighting unit 102*a* was the only unit in the addressable state 700. See circle '2'.

Next, the first lighting unit 102*a* places the next lighting unit 102*b*, into the addressable state 700, while also leaving the addressable state 700 itself. For example, in the embodiments where the addressable state 700 is triggered by the crossing of a voltage threshold 704, the first lighting unit 102*a* would drive the address output terminal 412 to cross the voltage threshold 704, after which the microcontroller 214 of the first lighting unit 102*a* knows to leave the addressable state 700 and ignore any additional address packets 600 that pass by. See circle '3'.

In response to leaving the addressable state 700, the freshly addressed first lighting unit 102*a* creates and sends a second address packet 600*b* comprising a second address 602*b* that is different from the first address 600*a*, which was adopted by the first lighting unit 102*a*. See circle '4'. In some embodiments, the generated address may be based, at least in part, on the previous address. For example, in some embodiments, the first lighting unit 102*a* may simply increment the first address 602*a* to create the second address 602*b*. Such a method also makes it easy to count the number of units in the system. In other embodiments, the addresses 602 may be generated using other methods, such as a random number, a running sequence (e.g. allowing the system to track the number of initializations since manufacture, etc.), and the like.

In some embodiments, the address ultimately adopted may be modified by the adopting unit 102. For example, in one embodiment, a light unit 102 adopting a new address may take the first address 602*a* from the first address packet 600*a*, and then prepend a value to it, indicating an attribute of that particular unit. For example, the address may indicate a model number or type, or an available palate or collection of evolutions. In such cases, after adopting an address 602, a light unit 102 would send out a new address packet for the next lighting unit, as well as a reporting packet that indicates the address 600 that was just modified and adopted.

The process continues until all of the lighting units 102 have received a unique address 602. As this process is going on, the control box 104 is making note of the address packets 600 being sent among the units, using what it observes to create and store the ordered list of addresses 612 previously discussed, which is used when controlling the lighting units 102. All but the last address packet are recorded, since the last address packet is sent by the last lighting unit 102 in the series, and is thus never adopted.

As mentioned above, in some embodiments, each lighting unit 102 may be installed in either direction (i.e., with either first cable connector 200 or second cable connector 202 connected to a downstream lighting unit 102). An auto-addressing scheme, as shown, for example, by the process flow 1400 in FIGS. 20A and 20B, may be used to allow for lighting units 102 to adopt addresses regardless of which cable connector (200 or 202) is downstream when arranged by a user. In some embodiments, the lighting unit 102 may look at both first cable connector 200 and second cable connector 202 as potential inputs and based on received signals determine which is arranged as the input (i.e., the upstream connection).

The process flow 1400 in FIGS. 20A and 20B shows operations for control box 104 in FIG. 20A and for the lighting units 102 in FIG. 20B. The communications and commands in process flow 1400 may be based on the RS485 standard, or they may be based on some other communications standard. At operation 1402, control box 104 may be powered on. Control box 104 may have an address of zero. At operation 1401, lighting units 102 may be powered on. In some embodiments, lighting units 102 may power on automatically as a result of control box 104 powering on. In some embodiments, after control box 104 is powered on (operation 1402), control box 104 sends at operation 1404 a command to clear the address for each lighting unit 102 in the system.

Meanwhile, at operation 1403, each lighting unit 102 waits for a command from control box 104. At operation 1405, it is determined whether a command has been received. If no command has been received, lighting unit 102 returns to operation 1403 to continue waiting for a command. If a command to clear its address has been received, lighting unit 102 moves on to operation 1407, during which lighting unit 102 clears any stored address and configures lines (i.e., address terminals) at both first cable connector 200 and second cable connector 202 as digital inputs (i.e., treats them both as address input terminals 414). These lines or address terminals may be considered address auto-detect lines because they are used to detect which line is upstream and to receive signals that assign an address for the lighting unit 102. In some embodiments, each lighting unit 102 also passes on the clear address command to the next lighting unit 102 in the system.

At operation 1406, control box 104 sets its output line to digital "0." As discussed below, the first lighting unit 102 in the system will read the line as digital "0." Setting a line to digital "0" may be a change in state as discussed above (e.g., dropping in voltage below a threshold). At operation 1408, control box 104 sends a command to set an address.

Meanwhile, each lighting unit 102 may wait for a command to set an address at operation 1409. At operation 1411, it is determined whether a command has been received. The first lighting unit 102 will be receiving a command from control box 104 while the other lighting units 102 will be receiving a command from the lighting unit 102 directly upstream from it. If no command has been received, lighting unit 102 returns to operation 1409 to continue waiting for a command. If a command to set its address has been received, lighting unit 102 moves on to operation 1413, at which point it is determined whether one of the address auto-detect lines (the address terminals which are both being treated as input terminals) is reading as digital "0." If not, lighting unit 102 returns to operation 1409 to continue waiting for a command.

If one of the address auto-detect lines is reading as digital "0," lighting unit 102 now knows to continue treating that line as an address input terminal 414. At this point, the lighting unit 102 sets its own address to one value greater than the last command source address at operation 1415. For the first lighting unit 102, this value will be 1 because the source will be the control box 104, which has an address of zero. For the second lighting unit 102, this value will be 2, and so on. The lighting unit 102 will also configure its other address auto-detect line (i.e., the one that was not set to digital "0") as an output such that it is then treated as an address output terminal 412 at operation 1417. In addition, at operation 1417, lighting unit 102 will then set its output line to digital "0," which will be read by the next lighting unit 102 in the system.

At operation 1419, the lighting unit 102 will then send a set address command through its output line. The set address command may go to the next lighting unit 102, prompting it to set its own address (with operation 1409, 1411, 1413, 1415, 1417, and 1419), and to the control box 104. At operation 1410, control box 104 waits for set address commands from lighting units 102. At operation 1412, it is determined whether a command has been received. If a command has been received, control box 104 will increase the count of lighting units 102 by one and reset a timer, after which it returns to operation 1410 to wait for an additional set address command (and repeat the process). If a command has not been received at operation 1412, it is determined whether the timer has expired at operation 1416. In some embodiments, the timer expires after 100 milliseconds. Other expiration times may be used. If the timer has not expired, the control box 104 returns to operation 1410 to wait for an additional set address command (and repeat the process).

If the timer has expired at operation 1416, control box 104 moves to operation 1418, at which point the control box 104 sends an acknowledge address command, beginning with the first lighting unit 102. The acknowledge address command sends a signal to the lighting unit 102 that control box 104 is aware of the address of that lighting unit 102. At operation 1421, each lighting unit 102 waits for an acknowledge address command. At operation 1423, it is determined whether the command has been received. If not, the lighting unit 102 returns to operation 1421 and continues to wait for the command. If the command has been received, the lighting unit 102 moves on to operation 1425, at which point the lighting unit 102 is ready for operation.

At operation 1420, control box 104 determines whether all counted lighting units 102 have been acknowledged. If not, control box 104 returns to operation 1418 and sends an acknowledge address command to the next unacknowledged lighting unit 102. This process is repeated until it is determined at operation 1420 that all lighting units 102 have been acknowledged. At this point, control box 104 moves on to operation 1422, at which point control box 104 is ready for operation.

Figure 8A:
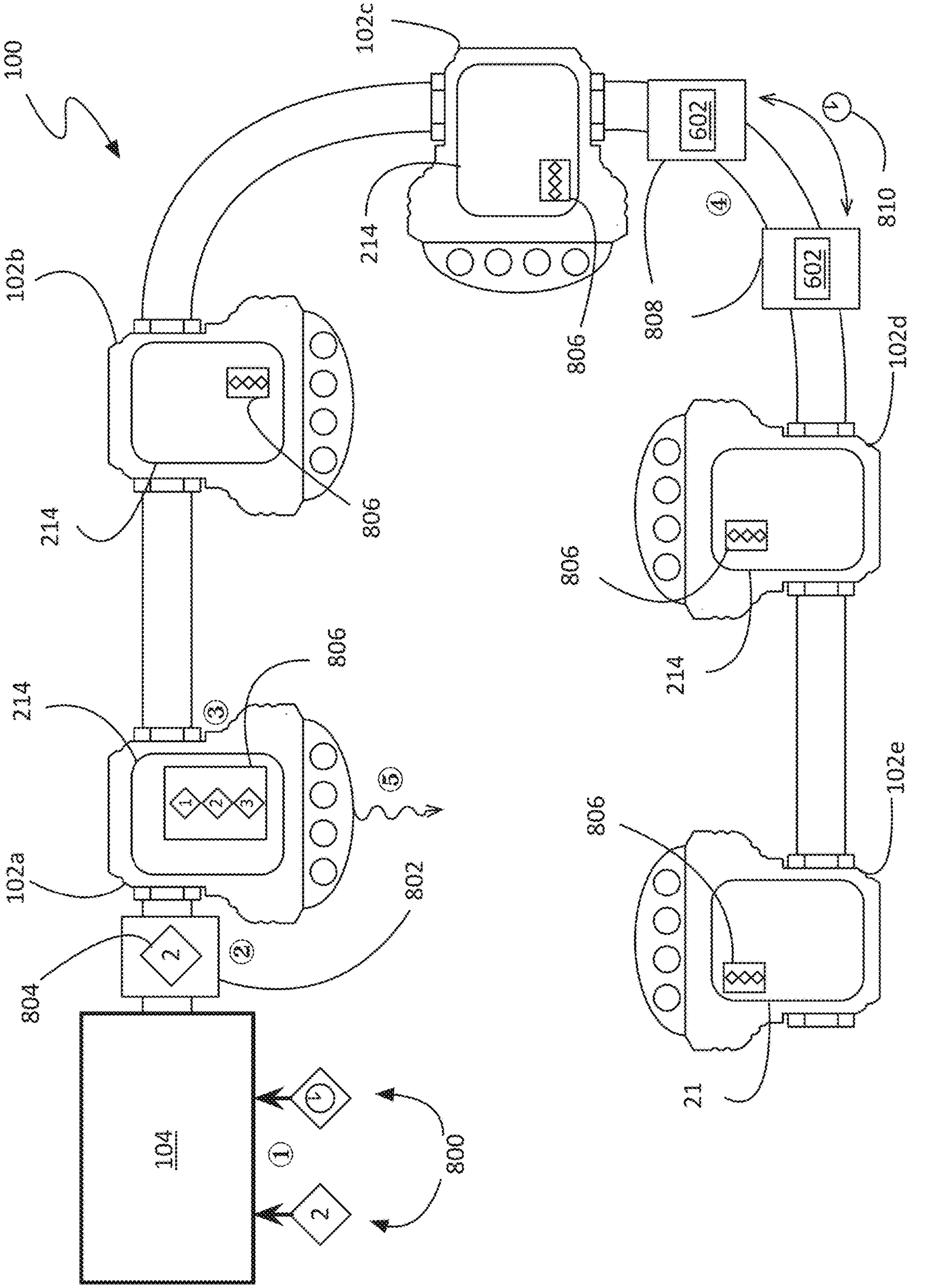
Figure 8B:
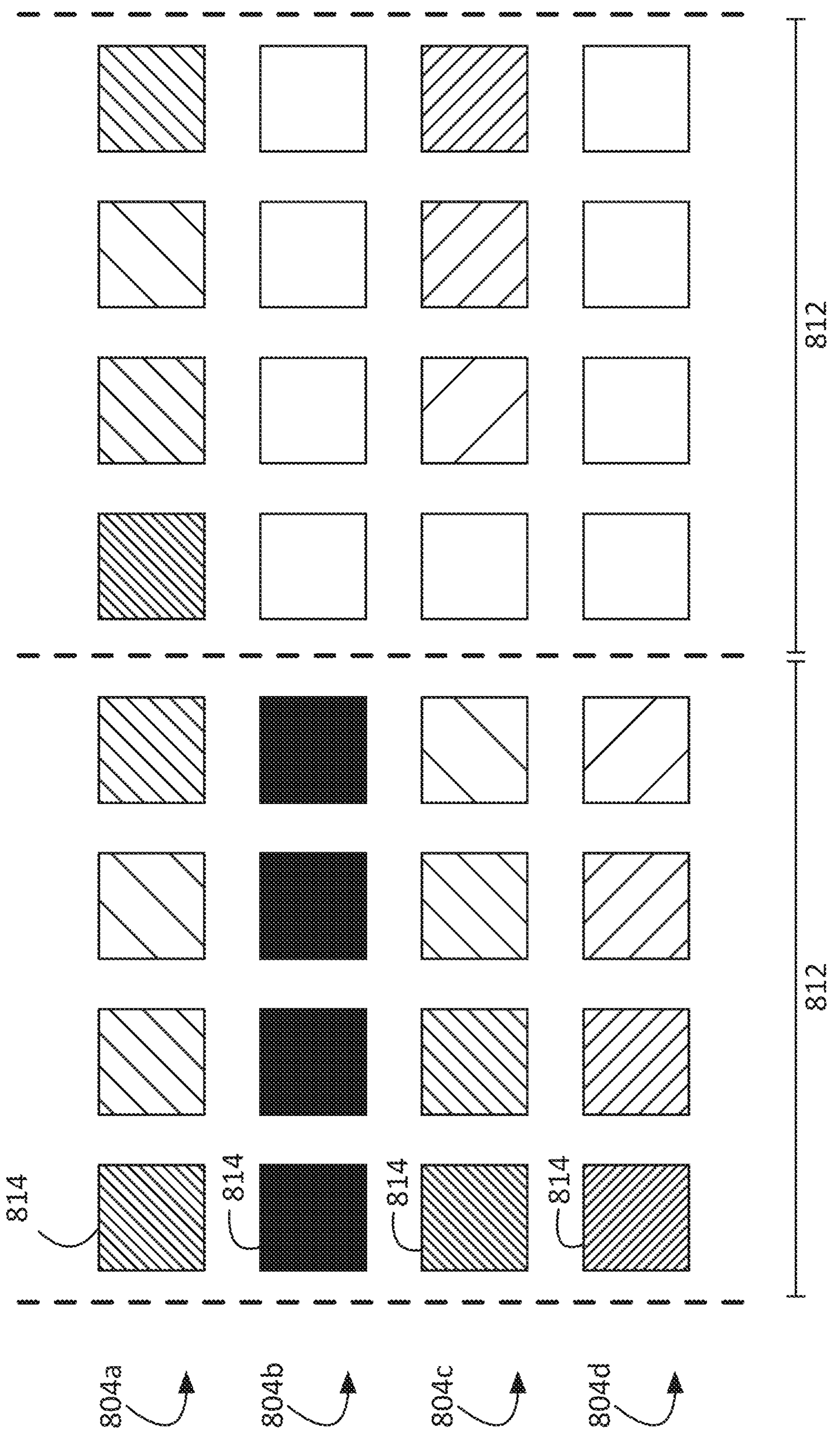
Figure 8C:
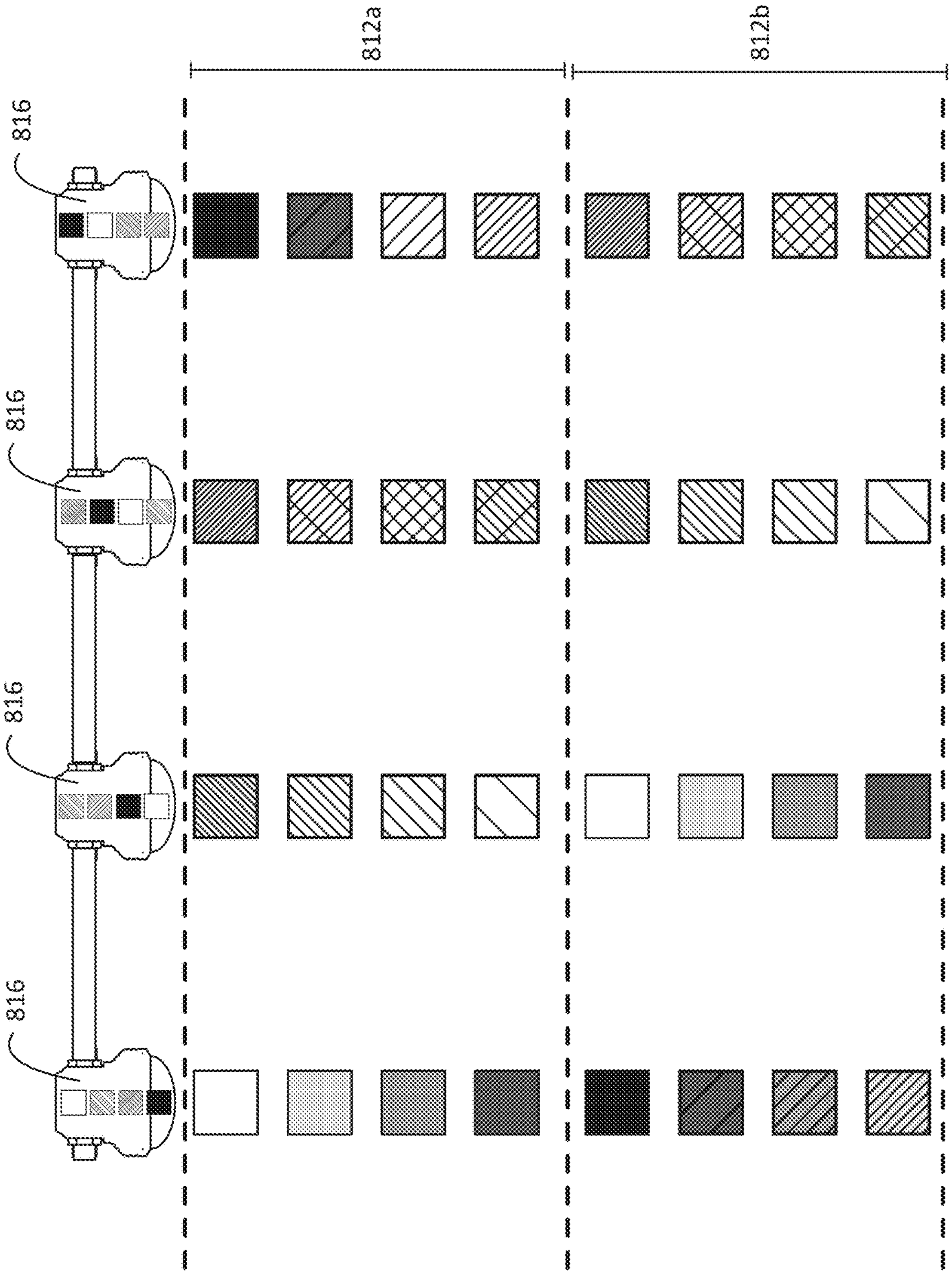

FIG. 8*a* is a non-limiting example of a process for implementing a mode in a modular lighting system 100. In the context of the present description and the claims that follow, a mode is a preprogramed sequence of modifications of color and/or brightness of the lighting units 102 within the system 100. Modes may also be referred to as light evolutions 804. Numerous examples of light evolutions/modes 804 will be discussed with respect to FIGS. 8B-11.

First, an instruction 800 is received from a user through a user interface of the control box 104. See circle '1'. In some embodiments, the control box 104 may have a physical user interface. See, for example, the non-limiting example of a user interface shown in FIG. 11. In other embodiments, the control box 104 may have additional interfaces including, but not limited to, mobile apps, web frontends, remote connection, voice commands, digital assistants, and the like.

The user is able to select from a number of predefined light evolutions 804, all of them having been predefined within the lighting units 102. Upon selection, the control box 104 sends a mode packet 802 comprising the light evolution 804 (i.e. identifying a light evolution 804, etc.) through the first cable connector 200 of the control box 104. See circle '2'.

Upon receipt, each lighting unit 102 is able to retrieve the predefined series of modifications that make up a light evolution 804, that have been stored in the microcontroller 214. See circle '3'. According to various embodiments, the lighting units 102 to not execute the indicated light evolution 804 until they receive a sync packet 808 from the control box 104. See circle '4'.

In the context of the present description and the claims that follow, a sync packet 808 is a packet meant to keep all of the lighting units 102 synchronized, executing light evolutions with precise timing, throughout the system 100. In some embodiments, a sync packet 808 may be addressed to a specific lighting unit 102, using its address 602. Such an arrangement may be advantageous for modes where not all of the lighting units are executing the evolution in sync. See, for example, the rain evolution, discussed with respect to FIG. 11, below. In other embodiments, a sync packet 808 may be universal, received and obeyed by all of the lighting units 102 at substantially the same time (e.g. allowing for miniscule delays due to signal propagation, etc.).

Upon receipt of a sync packet 808, each lighting unit 102 begins execution of the indicated, preprogramed light evolution 804 selected by the user from the collection 806 indicated on the user interface and predefined within each lighting unit 102. See circle '5'. In some embodiments, the evolutions 804 are defined as a sequence of modifications of one or more aspects of the light 110 that is being emitted by the unit 102 (e.g. color, brightness, etc.). The speed with which the unit 102 moves through these steps is defined by the control box 104. In some embodiments, this speed is received as an instruction 800 from a user.

According to various embodiments, this effect speed is roughly the period 810 at which the sync packets 808 are repeatedly sent by the control box 104 to the lighting units 102. Upon receipt of the sync packet 808, the units to which it was addressed (or all of the units, in some embodiments) initiate execution of the light evolution 804. After initiation, the evolution is executed on a per-unit level, using timing internal to the microcontroller 214. In some embodiments, upon definition of an effect speed, a timing calculation is made by the control box 104 and sent to the lighting units 102, so they know how quickly to execute the evolution upon receipt of the sync packet 808. This calculation is updated and redistributed to the units in response to any changes made to the effect speed (e.g. receiving a new value through the user interface, etc.).

FIG. **8*b* is a schematic view of four exemplary light evolutions, 804*a*-804*d*, modifying the output of a single lighting unit 102, over time. The patterns within the boxes are meant to represent different hue and brightness values as the light 110 changes according to the evolution 804. As shown, a light evolution 804 may be considered to be a sequence of modifications applied to attributes of light, such as hue and brightness, applied over a predefined period 812. According to various embodiments, these modifications are applied to a seed color value 814, or a starting point in the evolution. This allows predefined light evolutions 804** to be applied to any starting point defined by a user.

For example, light evolution **804*a* starts with a seed color value 814 that is dark, and over the period 812 it gets lighter and then moves back to dark again, creating a pulsing effect. This operation of increasing then decreasing the brightness could be applied to any color for the seed color value 814**.

In some embodiments, a light evolution 804 may be defined to move through a sequence of seed color values 814. See, for example, light evolution **804*b*, which shows a period of static light that is "black", meaning "black" is the seed color value 814, and then in the next period 812, the seed color is "white", and for that period 812 the color is static "white". Movement through a sequence of seed colors will be discussed in greater detail with respect to FIG. 8**C, below.

In some embodiments, a light evolution 804 may be defined to make use of features of the microcontroller 214 to "walk" between colors, creating a smooth transition between different points that define the evolution 804 itself. This may be referred to as a blended mode. See, for example, light evolution **804*c*, where the first period has a first seed color value 814 (i.e. diagonal lines close together), and the second period has a second seed color value 814 (i.e. white); the evolution 804*c*** itself comprises a walk from one seed color value to another.

As discussed with respect to FIG. 8A, in some embodiments, sync packets 808 may be addressed to specific lighting units 102 to create a particular effect. The fourth non-limiting example of a light evolution **804*d* is an example of this, in use. This evolution may be referred to as a rain evolution, and is more of a system-wide evolution than an evolution that is executed on a per-unit basis. Essentially, the control box 104 chooses a unit at random and addresses a sync packet 808 to it. Upon receipt, the unit executes the predefined rain evolution 804*d*, which starts with a seed color value that fades away (e.g. fades to zero light emission, etc.). The unit then lies dormant until the next address-specific sync packet 808 is received. In a system 100 with a plurality of lighting units 102, this evolution 804*d* creates a randomized, rain-like effect. As an option, the control box 104 may incorporate random variations in the interval between sending addressed sync packets 808**.

In some embodiments making use of addressed sync packets, a system 100 may combine multiple light evolutions 804. For example, a first light evolution could be executing on a first subset of lighting units, while a different evolution is being executed on a second subset. With addressed sync packets, the differing evolutions could also have differing execution times. In other embodiments, multiple evolutions may be executed using a share, universal sync packet 808.

FIG. **8*c* is a schematic view of a non-limiting example of a light evolution operating on a sequence 816 of seed color values among multiple lighting units 102. As shown, the lighting units 102 are executing a blended chase evolution 804, but the evolution was initiated after each lighting unit 102 was defined with light packets 604 having different color values 606. As previously discussed, the chase evolution 804 is defined to move through a sequence of color seed values 814, defined by the sequence of color values assigned to the series of units 102 before the evolution 804** began execution.

As shown, each lighting unit 102 comprises a sequence of color seed values 816. In some embodiments, each lighting unit 102 may assemble its own sequence of color seed values 816 representative of the different colors and/or patterns that have been defined within the series of lighting units 102. For example, each lighting unit 102 may record all of the light packets that 604 pass by, not just the packets that are addressed to that particular lighting unit. In some embodiments, the addresses 602 themselves may be used to create an ordered list of color values. In other embodiments, the sequence of seed color values 816 may be provided to all of the units 102 from the control box 104, with an indication of where each unit is within the sequence. Depending on the evolution chosen by the user, the pattern may be used in different ways (e.g. simply cycling through the different color values, cycling through assigned color values weighted by the number of units assigned the same value in a row, etc.). As shown, when the chase evolution is executed, at the start of the second period 812*b*, the seed color values have shifted over by one. In practice, this evolution has the appearance of a pattern of colors moving around the series in a circuit.

FIG. 9 is a process flow showing the execution of a non-limiting example of an audio-dependent light evolution 804 within a modular lighting system 100. According to some embodiments, the control box 104 may comprise an audio input 900 configured to receive an audio signal 902. Examples of the audio input 900 include, but are not limited to, a wired connection (e.g. plugging a wire into the control box 104 and the audio output of another device, etc.), a wireless connection (e.g. music streamed to the control box 104 from another device over a Bluetooth or WIFI connection, music streamed from a streaming service over an Internet connection directly to the control box 104, etc.), and an internal audio source (e.g. playback of an audio file stored within the audio system 104, etc.). Those skilled in the art will recognize that this audio-dependent light evolution 804 may be applied to other audio sources and input methods known in the art. As an option, some embodiments of the control box 104 also include a line out, allowing the system to be coupled to speakers or other audio systems. Thus, in some embodiments, as shown, for example, in FIG. 21, control box 104 may include an audio input 900 and an audio output 901. Audio input 900 and audio output 901 may be audio jacks, providing a port to receive a wired connection. Alternatively audio input 900 and audio input 901 may be wireless connections. In some embodiments, multiple control boxes 104 may be connected to each other through their respective audio inputs 900 and audio outputs 901. Each control box 104 may act as a speaker (thus becoming another piece of audio equipment) while also passing along an audio signal to another control box 104, or some other piece of audio equipment.

As shown, an audio signal 902 is received through the audio input 900 and fed into an audio processing unit 906. See circle '1'. In some embodiments, the audio processing unit 906 may be a discrete device within the control box 104 (e.g. a digital signal processor, etc.), while in other embodiments, the audio processing unit 906 may be a hardware module that is part of the processor 622, and in still other embodiments it may be a collection of executable instructions used by the processor 622. The audio processing unit 906 receives the audio signal, and manipulates it (e.g. Fourier transform, spectral decomposition, waveform analysis, etc.) to generate a value that describes some aspect of the audio signal. See circle '2'. For example, in one embodiment, the value may describe the intensity of a particular range of frequencies, such as the bass. Those skilled in the art will recognize this may be applied to any other way of representing an aspect of an audio signal as a value for the purpose of visualization. In some embodiments, the value may be scalar, while in others it may be a vector within a color space.

The control box 104 then uses at least part of the generated audio value to define a subset 904 of the lighting units 102, based upon their relative position in the ordered list of addresses 612 stored in the control box 104. See circle '3'. For example, in one embodiment, the subset 904 may start with the first unit 102*a* (the unit 102 closest to the control box 104) and extend to include a portion of the units 102 representative of the audio value compared to a predefined scale. In another embodiment, the subset 904 may be defined in a similar way, except extending in both directions from the unit determined to be at the center 910 of the ordered list 612.

The control box 104 then sends out a stream of sync packets 808 at the same rate the audio signal is being sampled and the audio value is being calculated. See circle '4'. These packets are addressed to the units belonging to the subset 904 determined from the audio signal. In practice, this audio-dependent light evolution can make the lighting units 102 operate together like a large scale audio meter, or other visualization device. In some embodiments, this "equalizer mode" may be combined with other light evolutions, where the equalizer evolution defines the brightness, and the color is defined by a different evolution, or even a different audio-based evolution processing the same audio signal to determine the color for each unit 102.

Other examples of audio-dependent evolutions include, but are not limited to, determining the color value for each unit based on multiple aspects of the audio signal 902, with one aspect defining brightness and another defining hue, with the relative position of the units being representative of a subset of potential audio signals 902 or values derived from audio signals. Those skilled in the art will recognize other audio or music visualization methods and technologies may be adapted for use with a modular lighting system 100 that as individually addressable units 102.

FIG. 10 is a process flow showing the application of a non-limiting example of a predefined, audio-dependent color value 606 within a modular lighting system 100. According to various embodiments, the lighting units 102 may be defined with one or more dynamic colors, or colors that have color values 606 that change as a function of time or some other dynamic value, rather than simply as a function of an elected light evolution 804. FIG. 10 shows a non-limiting example of such an implementation, where the lighting units have been set to "club" color, meaning that each of the LEDs 212 within the unit 102 may emit light 110 having different color values 606, and those color values may be determined by applied a predefined function to a provided audio signal 902, or a provided audio value 100 generated by the control box 104. As shown, the audio signal 902 is received and sent to the audio processing unit 906. See circle 'l'. The audio processing unit 906 may perform a function, such as a Fourier transform, on the signal, resulting in an audio value 1000. See circle '2'.

The control box 104 then proceeds to send a stream of sync packets, which may or may not be addressed, each packet comprising the audio value 1000 of a sample of the audio signal 902, the packets being sent at roughly the sample rate of the audio and/or the generation rate for the audio value. See circle '3'. When lighting units 102 having a color value indicative of this "club" color receive these sync packets 808, the audio values 1000 are used to change the color values of each LED 212 as a function of the audio value 1000. See circle '4'. In some embodiments, the audio value 1000 is used to cycle through a predefined set of hues, while in others it may be used to manipulate hue, brightness, and number of LEDs 212.

According to various embodiments, dynamic colors may be employed similar to any other color. For instance, they may be used in a light evolution 804. In some embodiments, a dynamic color may be used in the absence of an audio signal. For example, in some embodiments, the "club" color will move through a predefined set of hues at a fixed rate, rather than the sync rate, and may move through the color space along a fixed path.

FIG. 11 is a front view of a non-limiting example of a user interface 106 for a control box 104. As shown, the interface 106 provides the user with a number of Effects 1100, also referred to as modes or light evolutions 804. As shown, these may include a chase evolution 1102 (e.g. light evolutions 804*b* and 804 of FIG. 8B), a cycle evolution 1104, a fade evolution 1106, a pulse evolution 1108 (e.g. light evolution 804*a* of FIG. 8B), and a rain evolution (e.g. light evolution 804*d* of FIG. 8B). Also shown is a speed control 1111 allowing a user to modify the period 810 between transmission of sync packets 808.

According to various embodiments, the cycle light evolution 1104 is similar to the chase evolution 1102, except the "structure" of the series of lighting units 102 is maintained. For example, if a series of 5 units was defined with three red units, one blue unit, and one green unit, the chase evolution 1102 would result in that pattern moving in a cycle along the series, always having those three red units together, following after the blue and the green. In contrast, the application of the cycle evolution 1104 would result in the first three units moving from red to blue to green, with the remaining two units each cycling through hues further up the series of hues defined. If a series of units is programed with color values that does not have any sequential repeats, there is no visible difference between chase and cycle light evolutions, according to various embodiments.

The fade light evolution 1106 treats the entire series of lighting units 102 as having a single color, all dimming down to zero brightness before restoring brightness but with a different hue. In some embodiments, this may have appearance of the series "breathing". Also shown are controls to activate a music mode 1112 or an equalizer mode 1114 (e.g. the modes discussed with respect to FIG. 9). As well as controls for modifying the hue 1116 and/or brightness 1118 of individual lighting units 102, through the transmission of a light packet 604 comprising a color value 606 with the modified hue 608 and/or brightness 610 to the targeted unit 102. Also shown among the predefined hues is a "club" hue (e.g. the dynamic color discussed with respect to FIG. 10).

Also shown is a programming interface 1122, allowing a user to select individual units 102 and modify their hue and/or brightness. In some embodiments, the user interface may also allow a user to quickly replicate the last color value sent to a desired number of subsequent lighting units 102 in the series. Themes 1124 are sets of color values, where each lighting unit 102 has been assigned a color value. Themes allow a user to define a color for each unit, and quickly switch between sets of colors. According to various embodiments, the light evolutions 804 can operate on themes.

Where the above examples, embodiments and implementations reference examples, it should be understood by those of ordinary skill in the art that other modular lighting systems and lighting units could be intermixed or substituted with those provided. In places where the description above refers to particular embodiments of systems and methods of modular lighting, it should be readily apparent that a number of modifications may be made without departing from the spirit thereof and that these embodiments and implementations may be applied to other lighting technologies as well. Accordingly, the disclosed subject matter is intended to embrace all such alterations, modifications and variations that fall within the spirit and scope of the disclosure and the knowledge of one of ordinary skill in the art.

What is claimed is:

1. A modular lighting system comprising:

a first lighting unit comprising one or more light emitting diodes and a cable connector comprising a first set of pins;

a second lighting unit comprising one or more light emitting diodes and a cable connector comprising a second set of pins;

a cable connecting the cable connector of the first lighting unit to the cable connector of the second lighting unit, the cable comprising a first end having a first set of sockets configured to interface with the first set of pins of the cable connector of the first lighting unit, a second end having a second set of sockets configured to interface with the second set of pins of the cable connector of the second lighting unit, and a plurality of wires connecting the first set of sockets with the second set of sockets, wherein the first set of pins comprises one pin that is longer than every other pin in the first set of pins.

2. The modular lighting system of claim 1, wherein the first set of pins comprises six pins.

3. The modular lighting system of claim 1, wherein a subset of the first set of pins is configured to convey power.

4. The modular lighting system of claim 3, wherein the subset of the first set of pins comprises two pins.

5. The modular lighting system of claim 3, wherein the subset of the first set of pins comprises pins having a thickness of 1.5 millimeters.

6. The modular lighting system of claim 3, wherein the subset of the first set of pins comprises the one pin that is longer than every other pin in the first set of pins.

7. The modular lighting system of claim 1, wherein a subset of the first set of pins is configured to convey communication signals.

8. The modular lighting system of claim 7, wherein the subset of the first set of pins comprises four pins.

9. The modular lighting system of claim 7, wherein the subset of the first set of pins comprises pins having a thickness of 1 millimeter.

10. The modular lighting system of claim 1, wherein the plurality of wires comprises six wires.

11. The modular lighting system of claim 1, wherein the cable comprises a foil wrapped around at least two wires of the plurality of wires.

12. The modular lighting system of claim 11, wherein the foil is wrapped around five wires of the plurality of wires.

13. The modular lighting system of claim 11, wherein at least one wire of the plurality of wires is disposed exterior to and in contact with the foil.

14. The modular lighting system of claim 11, wherein the at least one wire of the plurality of wires is non-insulated.

15. A cable for a modular lighting system, the cable comprising: a first end having a first set of sockets configured to interface with a first set of pins of a cable connector of a first lighting unit, wherein the first set of pins comprises one pin that is longer than every other pin in the first set of pins; a second end having a second set of sockets configured to interface with a second set of pins of a cable connector of a second lighting unit; a plurality of wires connecting the first set of sockets with the second set of sockets; and a foil wrapped around a subset of the plurality of wires.

16. The cable of claim 15, wherein the plurality of wires comprises six wires.

17. The cable of claim 16, wherein the subset of the plurality of wires comprises five wires.

18. The cable of claim 17, wherein two of the five wires are twisted together.

19. The cable of claim 15, wherein at least one wire of the plurality of wires is disposed exterior to and in contact with the foil.

20. The cable of claim 15, wherein the first set of sockets comprises six sockets.

* * * * *